United States Patent
Kaneko et al.

(10) Patent No.: US 12,110,381 B2
(45) Date of Patent: Oct. 8, 2024

(54) RESIN MOLDING MATERIAL, METHOD FOR PRODUCING SAME, AND METHOD FOR PRODUCING RESIN MEMBER OR THE LIKE

(71) Applicant: MIYOSHI OIL & FAT CO., LTD., Tokyo (JP)

(72) Inventors: Kotaro Kaneko, Tokyo (JP); Koji Kawai, Tokyo (JP)

(73) Assignee: MIYOSHI OIL & FAT CO., LTD., Tokyo (JP)

(*) Notice: Subject to any disclaimer, the term of this patent is extended or adjusted under 35 U.S.C. 154(b) by 705 days.

(21) Appl. No.: 17/422,626

(22) PCT Filed: Feb. 25, 2020

(86) PCT No.: PCT/JP2020/007483
§ 371 (c)(1),
(2) Date: Jul. 13, 2021

(87) PCT Pub. No.: WO2020/175474
PCT Pub. Date: Sep. 3, 2020

(65) Prior Publication Data
US 2022/0089838 A1   Mar. 24, 2022

(30) Foreign Application Priority Data
Feb. 26, 2019  (JP) ................. 2019-032977

(51) Int. Cl.
*C08K 5/3475* (2006.01)
*B29C 48/00* (2019.01)
(Continued)

(52) U.S. Cl.
CPC .......... *C08K 5/3475* (2013.01); *B29C 48/022* (2019.02); *C08L 25/06* (2013.01);
(Continued)

(58) Field of Classification Search
CPC ....... C08K 5/3475; C08L 25/06; C08L 33/10; B29K 2025/06; B29C 48/022
(Continued)

(56) References Cited

U.S. PATENT DOCUMENTS

2018/0134872 A1* 5/2018 Shishino ................ C08K 5/378

FOREIGN PATENT DOCUMENTS

EP    3712138 A1    9/2020
EP    3904443 A1    11/2021
(Continued)

OTHER PUBLICATIONS

Extended European Search Report issued Oct. 26, 2022 for European Application No. 20763768.7.

*Primary Examiner* — Tae H Yoon
(74) *Attorney, Agent, or Firm* — Fox Rothschild LLP

(57) ABSTRACT

Provided are a resin molding material, a method for producing same, and a method for producing resin member or the like, said resin molding material being a resin molding material which is capable of reducing a loss of ultraviolet absorber, resulting in less contamination in facilities, minimizing the impact of harmful lights by efficiently absorbing harmful lights in the wavelength region of 380 to 400 nm (to 420 nm), and suppressing the absorption of lights having a wavelength of not shorter than 400 nm (420 nm) which is a primary cause of early-stage yellowing to thereby produce a member having a superior appearance since the ultraviolet absorber is less prone to be sublimed during hot-melt compounding (first/second processing) that requires a high-temperature processing, or during other heat processing. The resin molding material is used in heat processing and comprises a resin and a 2-phenylbenzotriazole derivative that contains a thioether-containing group.

13 Claims, 5 Drawing Sheets

(51) Int. Cl.
*C08L 25/06* (2006.01)
*C08L 33/10* (2006.01)
*B29K 25/00* (2006.01)
*B29K 33/00* (2006.01)

(52) U.S. Cl.
CPC .......... *C08L 33/10* (2013.01); *B29K 2025/06* (2013.01); *B29K 2033/12* (2013.01)

(58) Field of Classification Search
USPC .......................................................... 524/91
See application file for complete search history.

(56) References Cited

FOREIGN PATENT DOCUMENTS

| | | |
|---|---|---|
| JP | H09-95658 A | 4/1997 |
| JP | 2017061078 A | 3/2017 |
| JP | 2017-132948 A | 8/2017 |
| WO | 2016/021664 A1 | 2/2016 |
| WO | 2016/174788 A1 | 11/2016 |
| WO | 2017/170736 A1 | 10/2017 |

\* cited by examiner

RESIN MOLDING MATERIAL, METHOD FOR PRODUCING SAME, AND METHOD FOR PRODUCING RESIN MEMBER OR THE LIKE

CROSS-REFERENCE TO RELATED APPLICATIONS

This application is a § 371 national phase entry of International Patent Application No. PCT/JP2020/007483, filed on Feb. 25, 2020, which claims priority to and the benefit of Japanese Patent Application No. 2019-032977, filed on Feb. 26, 2019, both of which are hereby incorporated herein by reference in their entireties.

TECHNICAL FIELD

The present invention relates to a resin molding material to be used in a heating process such as melt compounding, a method for producing the same, and a method for producing a resin member or the like.

BACKGROUND ART

A resin member deteriorates by the effect of ultraviolet rays, which cause quality deteriorations such as discoloration and reduce its mechanical strength to thereby hinder long-term use. In order to suppress such quality deterioration or to control the wavelength of transmitted lights, it is a common practice to blend an ultraviolet absorber into a resin member.

Compounds having 2-phenylbenzotriazole skeletons have heretofore been disclosed in Patent documents 1 and 2, and since the ultraviolet absorption efficiency of the harmful long wavelength in the vicinity of 360 to 400 nm is low, there has been a problem that when an additive amount thereof is increased to compensate for this, not only the light having a wavelength of 360 to 400 nm but also the light having a wavelength of 400 nm or more are absorbed, which in turn leads to the occurrence of yellowing. Further, there has been a problem of contaminating facilities by sublimation in heat processing.

The present inventors proposed a 2-phenylbenzotriazole derivative having a sulfur-containing group as an ultraviolet absorber which efficiently and sufficiently absorbs harmful light particularly having a wavelength of 380 to 400 nm and suppresses absorption of light having a wavelength of 400 nm or more that triggers initial yellowing (Patent Documents 3 and 4). This ultraviolet absorber is capable of sufficiently absorbing light in a wavelength range of 250 to 400 nm owing to their optical property, has such a high ultraviolet absorption effect (molar extinction coefficient) that can efficiently absorb the light having the above-referred wavelength with a small additive amount thereof, and exhibits slopes in absorption peaks of 350 to 390 nm whose tangents are greater than those of conventional ultraviolet absorbers, thereby being capable of suppressing absorption of light with a wavelength in the vicinity of 400 nm or more, and also suppressing initial yellowing of a member to which the absorber is added.

PRIOR ART DOCUMENTS

Patent Documents

Patent document 1: JP-A-2017-061078
Patent document 2: JP-A-H9-95658
Patent document 3: WO2016/021664
Patent document 4: WO2016/174788

SUMMARY OF THE INVENTION

Problems to be Solved by the Invention

However, when manufacturing or using a resin molding material of, for example, a pellet, masterbatch or compound, the organic ultraviolet absorbers are subjected to a risk that they may be sublimated, which causes a resin member to deteriorate in ultraviolet absorption capability and, if the resin member is a transparent resin member, impairs transparency thereof, and a risk that the inside of the molding and/or processing apparatus will be contaminated therewith when the ultraviolet absorber is melt compounded by heat under thermal environment into a resin to obtain a resin molding material (first processing), and then the resin molding material containing the ultraviolet absorber and, optionally, other type(s) of resin are melt compounded by heat to obtain a resin member, a resin molded product or a resin molded article (second processing), or when the resultant resin member, resin molded product and/or resin molded article are thermally processed. An organic ultraviolet absorber less prone to sublimation is in need.

The present invention was made in view of the above circumstances, and it is an object of the present invention to provide a resin molding material, a method for producing the same, and a method for producing a resin member or the like in which the material is capable of reducing a loss of ultraviolet absorber, causing facilities to be less contaminated, and minimizing the impact of harmful lights by efficiently absorbing harmful lights in the wavelength region of 380 to 400 nm (to 420 nm) and suppressing the absorption of lights having a wavelength of not shorter than 400 nm (to 420 nm) which is a primary cause of early-stage yellowing to thereby produce a member having a superior appearance with a minimal impact being influenced thereupon by such harmful light in view of the fact that the ultraviolet absorber is less prone to be sublimed during hot-melt compounding (first processing/second processing) that requires high-temperature processing or during other types of heat processing.

Means to Solve the Problems

In order to solve the above problems, the inventive resin molding material is a resin molding material to be used in a heating process, and comprises a resin and a 2-phenylbenzotriazole derivative that contains a thioether-containing group. Examples of the resin molding material as used herein include, but are not limited to, a pellet, a masterbatch or a compound, which may be in the form of powder, grain, or cylindrical. The heating process includes, but is not particularly limited to, for example, hot-melt compounding.

In order to manufacture the above-described inventive resin molding material, the method for producing the resin molding material includes, but is not particularly limited to, in a preferred aspect thereof, a hot-melt compounding of a resin and a 2-phenylbenzotriazole derivative that contains a thioether-containing group.

The method for obtaining a resin member, a resin molded product or a resin molded article using the inventive resin molding material is characterized in that the resin molding material is melt compounded by heat.

Effects of the Invention

According to the inventive resin molding material and the method for producing a resin member, a resin molded product or a resin molded article using the same, as the ultraviolet absorber is less prone to be sublimed during hot-melt compounding (first processing/second processing) that requires a high-temperature processing, or during heat processing of the resultant resin member, resin molded product or resin molded article, there is provided a resin molding material which is capable of reducing a loss of ultraviolet absorber, resulting in less contamination in facilities, and minimizing the impact of harmful lights by efficiently absorbing harmful lights in the wavelength region of 380 to 400 nm (to 420 nm) (although the required wavelength varies depending on the intended use), and suppressing the absorption of lights having a wavelength of not shorter than 400 nm (420 nm) which is a primary cause of early-stage yellowing to thereby produce a member having a superior appearance with minimal impact being influenced thereupon by such harmful light.

According to the method for producing the inventive resin molding material, and the method for producing a resin member, resin molded product or resin molded article, the ultraviolet absorber is also less prone to be sublimed during hot-melt compounding in which high-temperature processing is required.

MODE FOR CARRYING OUT THE INVENTION

Figure 1:
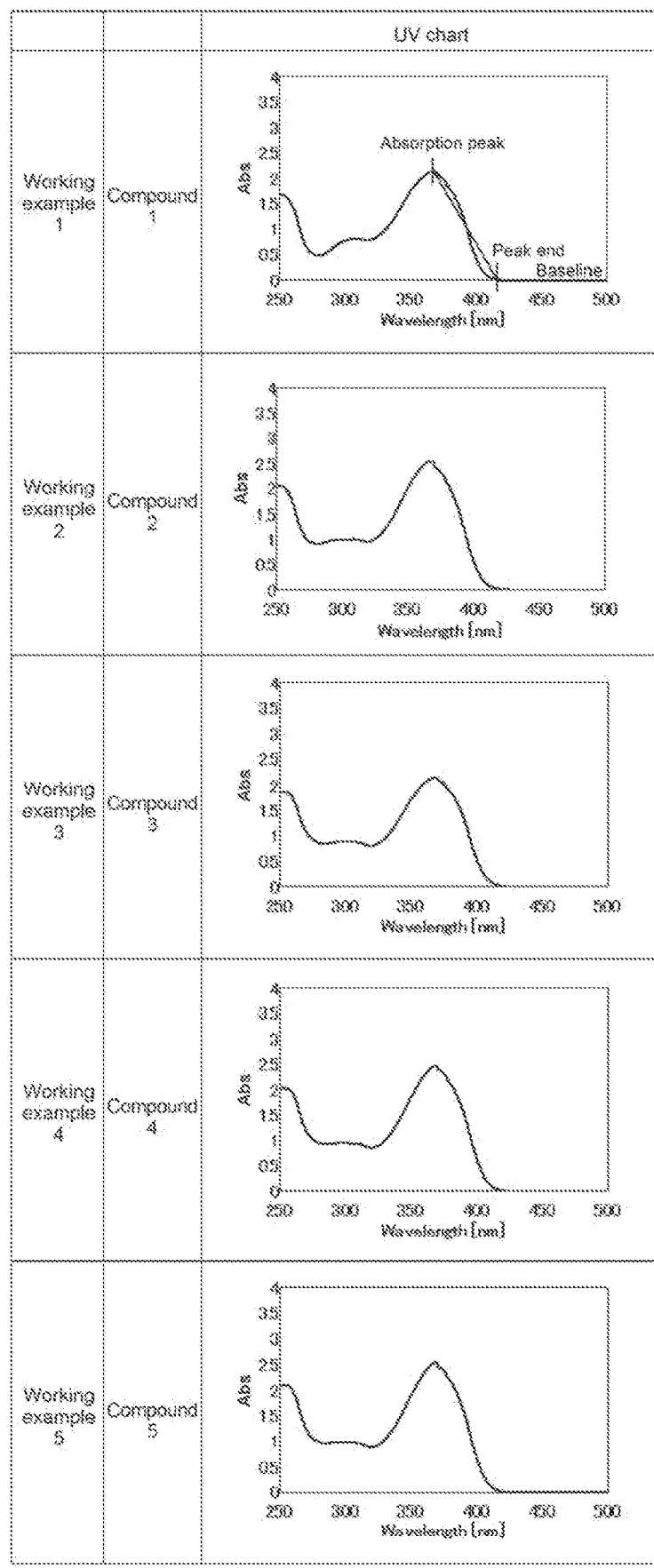
FIG. 1 is a set of ultraviolet-visible absorption spectra (UV charts) of compounds 1 to 5 produced in working examples 1 to 5.
Figure 2:
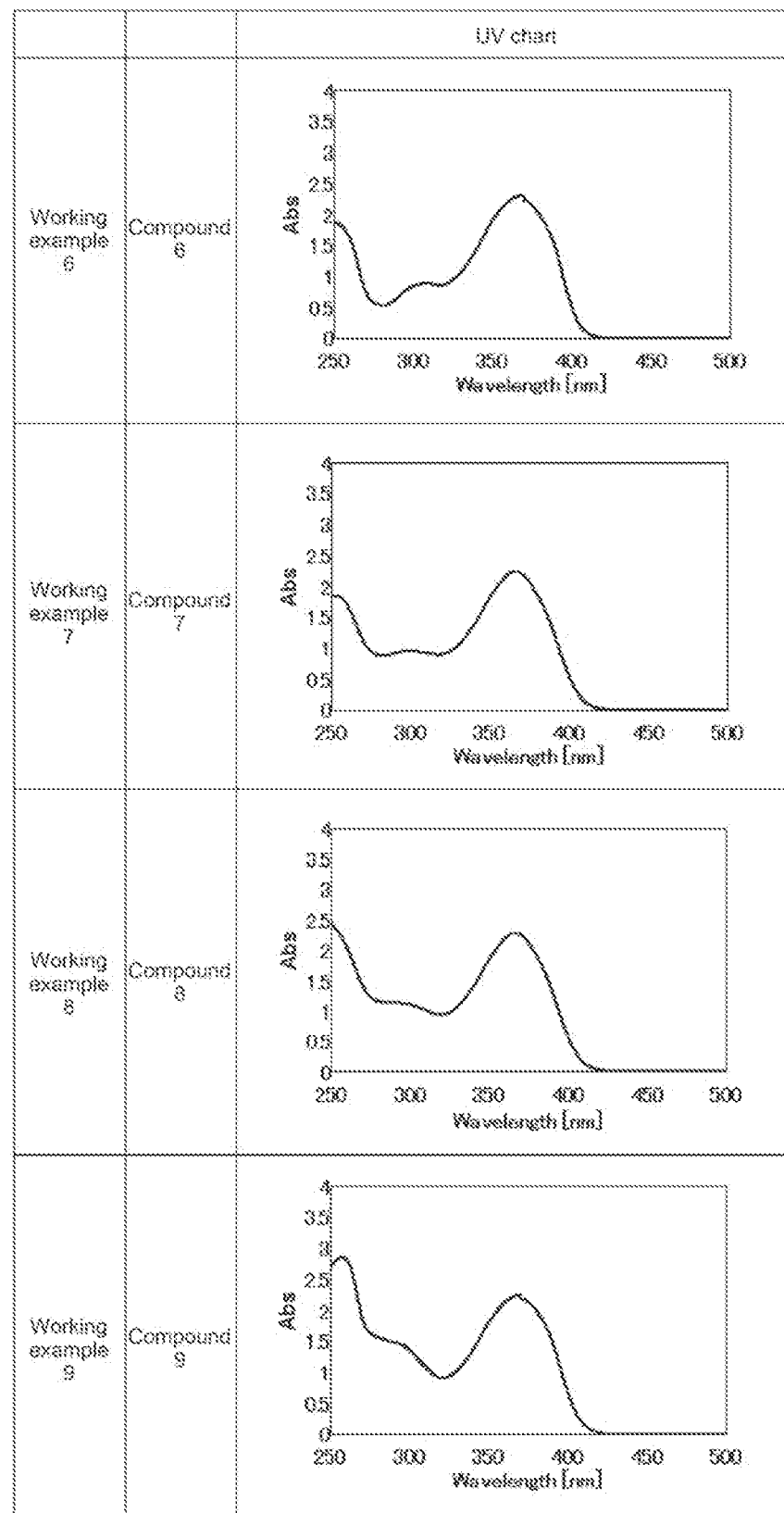
FIG. 2 is a set of ultraviolet-visible absorption spectra (UV charts) of compounds 6 to 9 produced in working examples 6 to 9.
Figure 3:
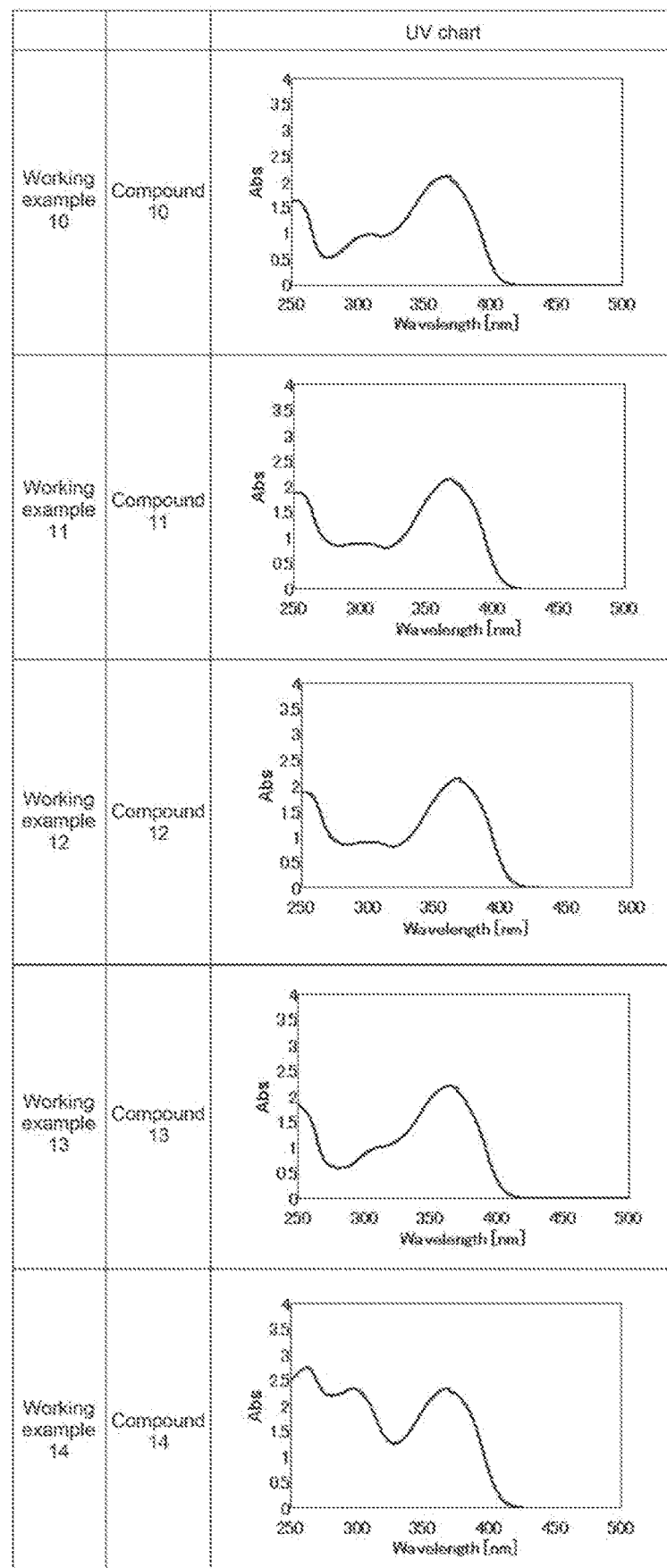
FIG. 3 is a set of ultraviolet-visible absorption spectra (UV charts) of compounds 10 to 14 produced in working examples 10 to 14.
Figure 4:
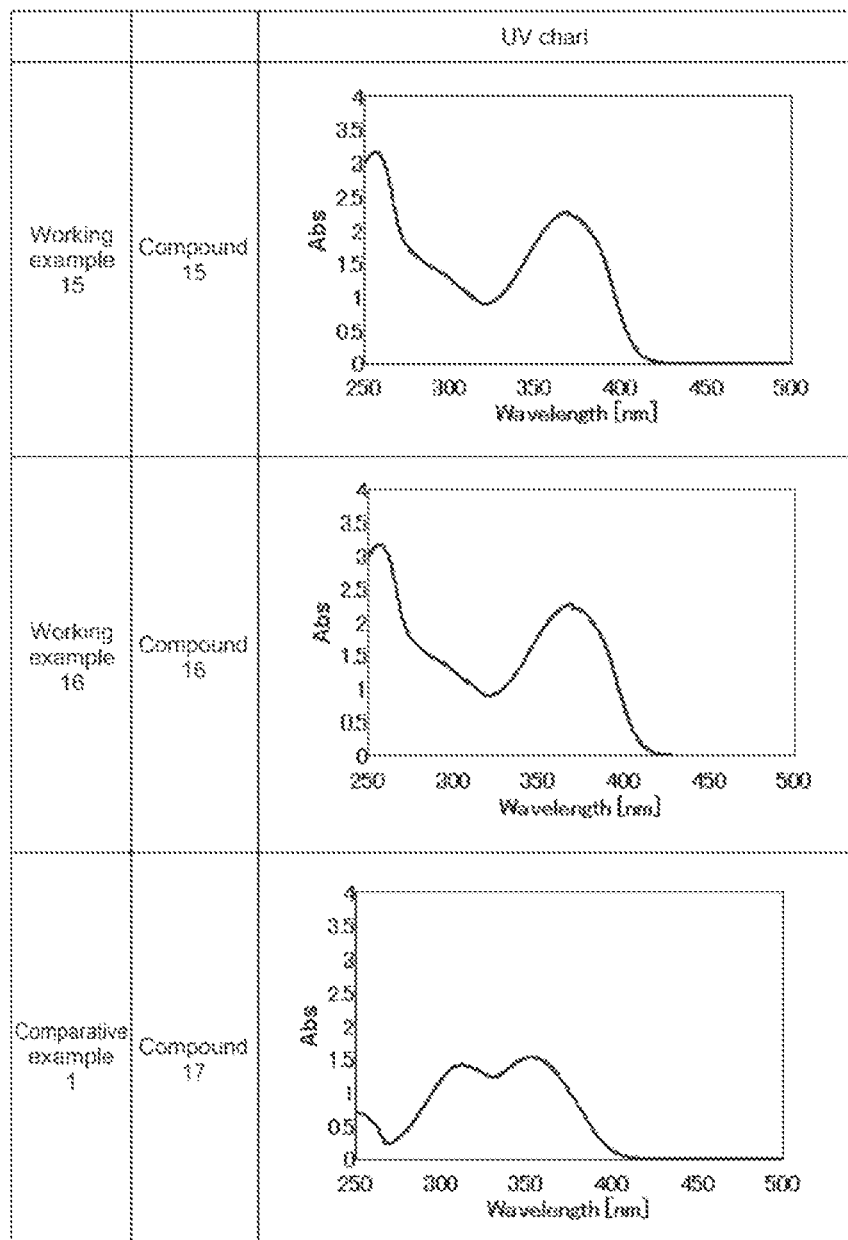
FIG. 4 is a set of ultraviolet-visible absorption spectra (UV charts) of compounds 15 to 17 produced in working examples 15 to 16 and in comparative example 1.

The present invention is described in detail hereunder.
[Substituent Group, Etc.]

In the present invention, "a monovalent or divalent group selected from an aromatic group, an unsaturated group, a nitrogen-containing group, a sulfur-containing group, an oxygen-containing group, a phosphorus-containing group, an alicyclic group, and a halogen atom" as used herein includes a group(s) capable of adjusting, for example, heat resistance, refractive index, melting point, light resistance and compatibility with resins. Examples of such group(s) are as follows.

The aromatic group contains an aromatic ring such as a benzene ring, a naphthalene ring and an anthracene ring, and preferably has 6 to 18, more preferably 6 to 14 carbon atoms. Examples of the monovalent aromatic group include, but are not particularly limited to, a phenyl group, 2-methylphenyl group, 3-methylphenyl group, 4-methylphenyl group, 2,4-dimethylphenyl group, 2,5-dimethylphenyl group, 3,4-dimethylphenyl group, 3,5-dimethylphenyl group, 2,4,5-trimethylphenyl group, 2,4,6-trimethylphenyl group, 4-ethylphenyl group, 4-propylphenyl group, 4-isopropylphenyl group, 4-butylphenyl group, 4-tert-butylphenyl group, 4-biphenyl group, 2-methoxyphenyl group, 3-methoxyphenyl group, 4-methoxyphenyl group, 2-ethoxyphenyl group, 3-ethoxyphenyl group, 4-ethoxyphenyl group, 2-chlorophenyl group, 2-fluorophenyl group, 4-fluorophenyl group, 2-trifluoromethylphenyl group, 4-trifluoromethylphenyl group, 1-naphthyl group, 2-naphthyl group, 1-anthracenyl group, 2-anthracenyl group and 9-anthracenyl group. Examples of the divalent aromatic group include, but are not particularly limited to, 1,4-phenylene group, 1,3-phenylene group, 1,2-phenylene group, 1,8-naphthylene group, 2,7-naphthylene group, 2,6-naphthylene group, 1,4-naphthylene group, 1,3-naphthylene group, 9,10-anthracenylene group, 1,8-anthracenylene group, 2,7-anthracenylene group, 2,6-anthracenylene group, 1,4-anthracenylene group and 1,3-anthracenylene group.

The unsaturated group contains an unsaturated bond(s) of carbon-carbon or carbon-hetero atom, such as a carbon-carbon double bond, a carbon-carbon triple bond, a carbon-oxygen double bond (e.g. carbonyl group, aldehyde group, ester group, carboxy group, carbamate group, urea group, amide group, imide group, carbamoyl group and urethane group), a carbon-nitrogen double bond (e.g. isocyanate group) and a carbon-nitrogen triple bond (e.g. cyano group and cyanato group). It is preferred that the unsaturated group have 1 to 10, more preferably 1 to 8 carbon atoms. Examples of such unsaturated group include, but are not particularly limited to, an acryloyl group, a methacryloyl group, a maleic acid monoester group, a styryl group, an allyl group, a vinyl group, an alkenyl group, an alkynyl group, a carbonyl group, an aldehyde group, an ester group, a carboxy group, a carbamate group, a urea group, an amide group, an imide group, a carbamoyl group, an acrylonitrile group, a cyano group, a cyanato group, an isocyanate group and a urethane group.

The nitrogen-containing group includes a cyano group, a nitro group or a primary to tertiary amino group, and preferably has 0 to 10 carbon atoms. Examples of such nitrogen-containing group include, but are not particularly limited to, a cyano group, a cyanato group, an isocyanate group, a nitro group, a nitroalkyl group, an amide group, a urea group, a urethane group, an imide group, a carbodiimide group, an azo group, a pyridine group, an imidazole group, an amino group, a primary amino group, a secondary amino group, a tertiary amino group, an aminoalkyl group, 3,4,5,6-tetrahydrophthalimidylmethyl group and 2-[6-(2H-benzotriazol-2-yl-)-4-(1,1,3,3-tetramethylbutyl)phenol-yl]-methyl group.

The sulfur-containing group includes a thiol group, a thioether group, a sulfide group, a disulfide group, a thioester group, a thioamide group, a sulfonyl group, a sulfo group, a thiocarbonyl group or a thiourea group, and preferably has 0 to 10 carbon atoms. Examples of the sulfur-containing group include, but are not particularly limited to, a thiomethoxy group, a thioethoxy group, a thio-n-propoxy group, a thioisopropoxy group, a thio-n-butoxy group, a thio-t-butoxy group, a thiophenoxy group, a p-methylthiophenoxy group, a p-methoxythiophenoxy group, a thiophene group, a thiazole group, a thiol group, a thioether group, a sulfo group, a sulfide group, a disulfide group, a thioester group, a thioamide group, a sulfonyl group, a thiocarbonyl group, a thiourea group, a thiocarbamate group and a dithiocarbamate group.

When the oxygen-containing group includes an aromatic ring group or an alicyclic group, it is preferred that the oxygen-containing group have 6 to 12 carbon atoms. When the oxygen-containing group does not contain an aromatic ring group or an alicyclic group, it is preferred that the oxygen-containing group have 0 to 18 carbon atoms. Examples of such oxygen-containing group include a hydroxy group, a methoxy group, an ethoxy group, a propoxy group, a butoxy group, a phenoxy group, a methylphenoxy group, a dimethylphenoxy group, a naphthoxy group, a phenylmethoxy group, a phenylethoxy group, an acetoxy group, an acetyl group, an aldehyde group, a carboxy group, an ether group, a carbonyl group, an ester group, an oxazole group, a morpholine group, a carbamate group, a carbamoyl group, a urea group, an amide group, an imide group, a urethane group and a polyoxyethylene group.

The phosphorus-containing group includes a phosphine group, a phosphite group, a phosphonic acid group, a phosphinic acid group, a phosphoric acid group or a phosphate ester group. When the phosphorus-containing group contains an aromatic ring group or an alicyclic group, it is preferred that the phosphorus-containing group have 6 to 22 carbon atoms. When the phosphorus-containing group does not contain an aromatic ring group or an alicyclic group, it is preferred that the phosphorus-containing group have 0 to 6 carbon atoms. Examples of such phosphorus-containing group include, but are not particularly limited to, a trimethylphosphine group, a tributylphosphine group, a tricyclohexylphosphine group, a triphenylphosphine group, a tritolylphosphine group, a methylphosphite group, an ethylphosphite group, a phenylphosphite group, a phosphonic acid group, a phosphinic acid group, a phosphoric acid group and a phosphoric acid ester group.

The alicyclic group preferably has 3 to 10 carbon atoms, more preferably 3 to 8 carbon atoms. Examples of the alicyclic group includes a cyclopropyl group, a cyclobutyl group, a cyclopentyl group, a cyclohexyl group, a cycloheptyl group, a cyclooctyl group and groups containing these groups as skeletons.

Examples of the halogen atom include a fluorine atom, a chlorine atom, a bromine atom and an iodine atom.

The 2-phenylbenzotriazole derivative according to the invention may be represented by the following formula (I):

[Chemical formula 1]

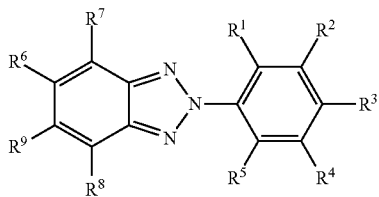
(I)

wherein each of the R to R independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group, a halogen atom and a thioether-containing group represented by the following formula (i) (in the case of a divalent group, any two of the $R^1$ to $R^9$ together form a ring). At least one of the $R^1$ to $R^9$ is a thioether-containing group represented by the following formula (i):

[Chemical formula 2]

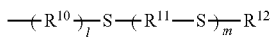
(i)

wherein in the formula (i), $R^{10}$ represents a divalent hydrocarbon group having 1 to 20 carbon atoms in which hydrogen atoms may be substituted with, at least one of two ends may be interrupted by, or carbon-carbon bonds may be interrupted by a monovalent or divalent group selected from an aromatic group, an unsaturated group, a nitrogen-containing group, a sulfur-containing group, an oxygen-containing group, a phosphorus-containing group, an alicyclic group and a halogen atom;

$R^{11}$ represents a divalent hydrocarbon group having 1 to 20 carbon atoms in which hydrogen atoms may be substituted with, at least one of two ends may be interrupted by, or carbon-carbon bonds may be interrupted by a monovalent or divalent group selected from an aromatic group, an unsaturated group, a nitrogen-containing group, a sulfur-containing group, an oxygen-containing group, a phosphorus-containing group, an alicyclic group and a halogen atom with the proviso that each $R^{11}$ is independently provided if m is not smaller than 2;

$R^{12}$ represents a hydrogen or a group represented by $-(R^{13})_n-R^{14}$ wherein $R^{13}$ represents a divalent hydrocarbon group having 1 to 20 carbon atoms in which hydrogen atoms may be substituted with, base ends thereof may be interrupted by, or carbon-carbon bonds may be interrupted by a monovalent or divalent group selected from an aromatic group, an unsaturated group, a nitrogen-containing group, a sulfur-containing group, an oxygen-containing group, a phosphorus-containing group, an alicyclic group and a halogen atom, and $R^{14}$ represents a hydrogen atom or a substituent group containing one of the skeletons selected from benzotriazole, benzophenone, benzoic acid ester and triazine, and n represents an integer of 0 or 1; and l represents an integer of 0 or 1, and m represents an integer of 0 to 3.

In formula (i), $R^{10}$ represents a monovalent or divalent hydrocarbon group having 1 to 20, preferably 1 to 10, more preferably 1 to 5, even more preferably 1 to 3 carbon atoms in which hydrogen atoms may be substituted with, at least one of the two ends thereof may be interrupted by, or carbon-carbon bonds may be interrupted by a monovalent or divalent group selected from an aromatic group, an unsaturated group, a nitrogen-containing group, a sulfur-containing group, an oxygen-containing group, a phosphorus-containing group, an alicyclic group and a halogen atom.

Examples of the divalent hydrocarbon group represented by $R^{10}$ include an aliphatic hydrocarbon group, an alicyclic hydrocarbon group and an aromatic hydrocarbon group.

When the divalent hydrocarbon group is such a group with the hydrogen atoms therein substituted by, at least one of the two ends thereof interrupted by, or the carbon-carbon bonds therein interrupted by the monovalent or divalent group(s), there are no particular limitations on the number of the monovalent or divalent groups; for example, the number of such groups may be not larger than two, or not larger than one.

Specific examples of the aromatic group, unsaturated group, nitrogen-containing group, sulfur-containing group, oxygen-containing group, phosphorus-containing group, alicyclic group and halogen atom as the monovalent or divalent groups include those as listed in the section of [Substituent group, etc.].

In formula (i), l represents an integer of 0 or 1. Preferably, l is 0.

In formula (i), $R^{11}$ independently represents (if m is two or more) a divalent hydrocarbon group having 1 to 20, preferably 1 to 10, more preferably 1 to 5, even more preferably 1 to 3 carbon atoms in which hydrogen atoms may be substituted with, at least one of the two ends thereof may be interrupted by, or carbon-carbon bonds may be interrupted by a monovalent or divalent group selected from an aromatic group, an unsaturated group, a nitrogen-containing group, a sulfur-containing group, an oxygen-containing group, a phosphorus-containing group, an alicyclic group and a halogen atom.

Examples of the divalent hydrocarbon group represented by $R^{11}$ include an aliphatic hydrocarbon group, an alicyclic hydrocarbon group and an aromatic hydrocarbon group.

When the divalent hydrocarbon group is such a group with the hydrogen atoms therein substituted by, at least one of the two ends thereof interrupted by, or the carbon-carbon bonds therein interrupted by the monovalent or divalent group(s), there are no particular limitations on the number of the monovalent or divalent groups; for example, the number of such groups may be not larger than two, or not larger than one.

Specific examples of the aromatic group, unsaturated group, nitrogen-containing group, sulfur-containing group, oxygen-containing group, phosphorus-containing group, alicyclic group and halogen atom as the monovalent or divalent groups include those as listed in the section of [Substituent group, etc.].

In formula (i), m represents an integer of 0 or 3, preferably 0 or 1, more preferably 0.

In formula (i), $R^{12}$ represents a hydrogen atom or a group represented by $-(R^{13})_n-R^{14}$, wherein $R^{13}$ represents a divalent hydrocarbon group having 1 to 20 carbon atoms in which hydrogen atoms may be substituted with, base ends thereof may be interrupted by, or carbon-carbon bonds may be interrupted by a monovalent or divalent group selected from an aromatic group, an unsaturated group, a nitrogen-containing group, a sulfur-containing group, an oxygen-containing group, a phosphorus-containing group, an alicyclic group and a halogen atom; and $R^{14}$ represents a hydrogen atom or a substituent group containing one of the skeletons selected from benzotriazole, benzophenone, benzoic acid ester and triazine; and n represents an integer of 0 or 1.

Examples of the divalent hydrocarbon group represented by $R^{13}$ include an aliphatic hydrocarbon group, an alicyclic hydrocarbon group, and an aromatic hydrocarbon group.

When the divalent hydrocarbon group represented by $R^{13}$ is such a group with hydrogen atoms therein substituted by, base ends thereof interrupted by, or the carbon-carbon bonds therein interrupted by the monovalent or divalent group(s), the number of the monovalent or divalent groups is preferably not larger than two, more preferably not larger than one.

Specific examples of the aromatic group, unsaturated group, sulfur-containing group, oxygen-containing group, phosphorus-containing group, alicyclic group, and halogen atom as the monovalent or divalent groups include those as listed in the section of [Substituent group, etc.].

If $R^{14}$ is a substituent group containing any one of the skeletons selected from benzotriazole, benzophenone, benzoic acid ester and triazine, examples of the substituent group containing benzotriazole include a substituent group as represented by the following formula (A), examples of the substituent group containing benzophenone include a substituent group as represented by the following formula (B), examples of the substituent group containing benzoic acid ester include a substituent group as represented by the following formula (C), and examples of the substituent group containing triazine include a substituent group as represented by the following formula (D).

[Chemical formula 3]

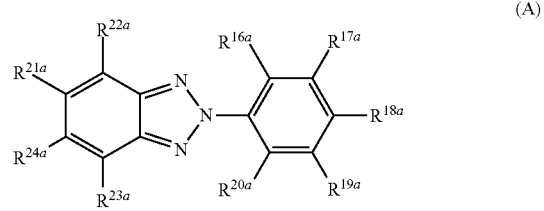

(A)

wherein in formula (A), any one of the $R^{11a}$ to $R^{24a}$ represents a monovalent binding moiety to which $R^{13}$ in the formula (i) or a terminal sulfur atom is bonded, and each of the remaining $R^{16a}$ to $R^{24a}$ independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group and a halogen atom (in the case of a divalent group, any two of the $R^{16a}$ to $R^{24a}$ together form a ring).

[Chemical formula 4]

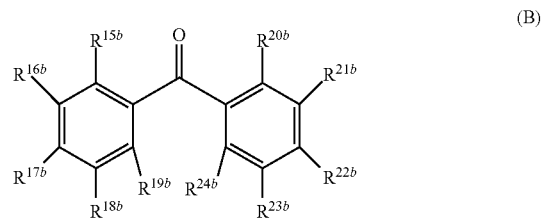

(B)

wherein in formula (B), any one of the $R^{15b}$ to $R^{24b}$ represents a monovalent binding moiety to which $R^{13}$ in the formula (i) or a terminal sulfur atom is bonded, and each of the remaining $R^{15b}$ to $R^{24b}$ independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group and a halogen atom (in the case of a divalent group, any two of the $R^{15b}$ to $R^{24b}$ together form a ring).

[Chemical formula 5]

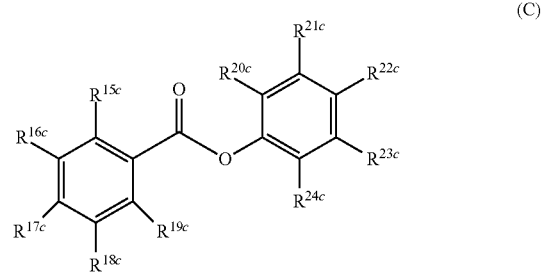

(C)

wherein in formula (C), any one of the $R^{15c}$ to $R^{24c}$ represents a monovalent binding moiety to which $R^3$ in the formula (i) or a terminal sulfur atom is bonded, and each of the remaining $R^{15c}$ to $R^{24c}$ independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group and a halogen atom (in the case of a divalent group, any two of the $R^{15c}$ to $R^{24c}$ together form a ring).

[Chemical formula 6]

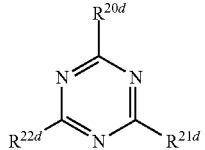

(D)

wherein in formula (D), either one of the following [1] and [2] is applied to $R^{20d}$ to $R^{22d}$.

At least one of the $R^{20d}$ to $R^{22d}$ is a monovalent binding moiety to which $R^{13}$ in the formula (i) or a terminal sulfur atom is bonded, and each of the remaining $R^{20d}$ to $R^{22d}$ independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group, a halogen atom and a group as represented by the following formula (d) (in the case of a divalent group, any two of the $R^{20d}$ to $R^{22d}$ together form a ring):

[Chemical formula 7]

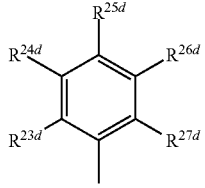

(d)

wherein each of the $R^{23d}$ to $R^{27d}$ independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group and a halogen atom (in the case of a divalent group, any two of the $R^{23d}$ to $R^{27d}$ together form a ring). That is, one to three groups as set forth in formula (I) may be bonded to the triazine ring.

At least one of the $R^{20d}$ to $R^{22d}$ is a group represented by the following formula (d'):

[Chemical formula 8]

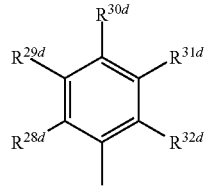

(d')

wherein at least one of the $R^{28d}$ to $R^{32d}$ represents a monovalent binding moiety to which $R^{13}$ in the formula (i) or a terminal sulfur atom is bonded, and each of the remaining $R^{28d}$ to $R^{32d}$ independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group and a halogen atom (in the case of a divalent group, any two of the $R^{28d}$ to $R^{32d}$ together form a ring); and each of the remaining $R^{20d}$ to $R^{22d}$ independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group and a halogen atom (in the case of a divalent group, any two of the $R^{28d}$ to $R^{32d}$ together form a ring). That is, one to five groups as set forth in formula (I) may be bonded to the benzene ring as represented in the above-mentioned formula (d').

In the formula (A) to (D), (d) and (d'), if any of the $R^{16a}$ to $R^{24a}$, $R^{15b}$ to $R^{24b}$, $R^{15c}$ to $R^{24c}$, $R^{20d}$ to $R^{27d}$, and $R^{28d}$ to $R^{32d}$ is/are hydrocarbon group(s), such hydrocarbon group may, for example, be an aliphatic hydrocarbon group, an alicyclic hydrocarbon group or an aromatic hydrocarbon group. Among these groups, an aliphatic hydrocarbon group is preferred. Examples of such aliphatic hydrocarbon group include a linear or branched alkyl group, a linear or branched alkenyl group and a linear or branched alkynyl group. Specific examples thereof include a methyl group, ethane-1-yl group, propane-1-yl group, 1-methylethane-1-yl group, butane-1-yl group, butane-2-yl group, 2-methylpropane-1-yl group, 2-methylpropane-2-yl group, pentane-1-yl group, pentane-2-yl group, 2-methylbutane-1-yl group, hexane-1-yl group, 2-methylpentane-1-yl group, 3-methylpentane-1-yl group, heptane-1-yl group, 3-ethylpentane-1-yl group, 2-methylhexane-yl group, 3-methylhexane-yl group, octane-1-yl group, 2-methylheptane-1-yl group, 3-methylheptane-1-yl group, 4-methylheptane-1-yl group, 2-ethylhexane-1-yl group, 3-ethylhexane-1-yl group, 1,1,3,3-tetramethylbutyl nonane-1-yl group, 3-ethylheptane-1-yl group, 4-ethylheptane-1-yl group, 2-methyloctane-1-yl group, 3-methyloctane-1-yl group, 4-methyloctane-1-yl group, decane-1-yl group, 4-propylheptane-1-yl group, 3-ethyloctane-1-yl group, 4-ethyloctane-1-yl group, undecane-1-yl group, dodecane-1-yl group, 2-methylundecane-1-yl group, 2-ethyldecane-1-yl group, tridecane-1-yl group, tetradecane-1-yl group, pentadecane-1-yl group, hexadecane-1-yl group, heptadecane-1-yl group and octadecane-1-yl group. Among these groups, linear or branched alkyl groups having 1 to 8 carbon atoms are preferred, and linear or branched alkyl groups having 1 to 4 carbon atoms are more preferred.

If any of the $R^{16a}$ to $R^{24a}$, $R^{15b}$ to $R^{24b}$, $R^{15c}$ to $R^{24c}$ and $R^{20d}$ to $R^{27d}$ is a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group and a halogen atom, examples thereof include those as listed in the section of [Substituent group, etc.].

In formula (i), $R^{12}$ may, for example, be a group as represented by the following formula (j):

[Chemical formula 9]

$$-((X)_o-(Y)_p-(Z)_q)-H \qquad (j)$$

wherein X is a divalent aliphatic hydrocarbon group of which a hydrogen atom(s) may be substituted, Y is a divalent aromatic or alicyclic hydrocarbon group of which a hydrogen atom(s) may be substituted, Z is either a divalent heteroatom-containing group $Z^1$ selected from a nitrogen-containing group, an oxygen-containing group, a sulfur-containing group and a phosphorus-containing group, or a divalent heteroatom $Z^2$ selected from an oxygen atom and a sulfur atom, and o, p and q are integers not smaller than 0. X, Y and Z, respectively provided in the number of o, p and q are independently provided, and the X, Y and Z may be in any sequential order. In one example, if at least one of the X, Y and Z is provided in the number of two or more, any Xs are not put next to each other among themselves, any Ys are not put next to each other among themselves, and/or any Zs are not put next to each other among themselves. At least one of the o and p is an integer of not smaller than 1.

The divalent aliphatic hydrocarbon group X has a carbon number of 1 to 20, preferably of 1 to 12 and may, for example, be a linear or branched alkyl group, a linear or branched alkenyl group and a linear or branched alkynyl group. Specific examples of these include, but are not particularly limited to, a methylene group, ethane-1,2-diyl group, propane-1,3-diyl group, 1-methylethane-1,2-diyl group, butane-1,4-diyl group, butane-1,3-diyl group, 2-methylpropane-1,3-diyl group, pentane-1,5-diyl group, pentane-1,4-diyl group, hexane-1,6-diyl group, heptane-1,7-diyl group, octane-1,8-diyl group, nonane-1,9-diyl group, decane-1,10-diyl group, undecane-1,11-diyl group, dodecane-1,12-diyl group, tridecane-1,13-yl group, tetradecane-1,14-yl group, pentadecane-1,15-yl group, hexadecane-1,16-yl group, heptadecane-1,17-yl group, octadecane 1,18-yl group, nonadecane-1,19-yl group and eicosane-1,20-yl group. Among the above examples, an aliphatic hydrocarbon group of which a hydrogen atom is not substituted is preferred. An alkylene group is more preferred, and a linear alkylene group is even more preferred.

Among the divalent aromatic and alicyclic hydrocarbon groups Y, the aromatic hydrocarbon group has a carbon number of 6 to 18, preferably of 6 to 14. The aromatic hydrocarbon group includes an aromatic ring such as a benzene ring, naphthalene ring, or anthracene ring, and the hydrogen atom of the aromatic ring may be substituted by, e.g., an aliphatic hydrocarbon group. Although not particularly limited, examples of these include phenylene groups (such as 1,4-phenylene group, 1,3-phenylene group, 1,2-phenylene group), naphthylene groups (such as 1,8-naphthylene group, 2,7-naphthylene group, 2,6-naphthylene group, 1,4-naphthylene group, 1,3-naphthylene group) and anthracenylene groups (such as 9,10-anthracenylene group, 1,8-anthracenylene group, 2,7-anthracenylene group, 2,6-anthracenylene group, 1,4-anthracenylene group and 1,3-anthracenylene group). Among these groups, preferred is an aromatic hydrocarbon group of which a hydrogen atom is not substituted. A phenylene group is more preferable.

Among the divalent aromatic and alicyclic hydrocarbon groups Y, the alicyclic hydrocarbon group has a carbon number preferably of 3 to 10, more preferably of 3 to 8, and contains an aliphatic ring of which a hydrogen atom may be substituted by, for example, an aliphatic hydrocarbon. Specific examples include a cyclopropylene group, a cyclobutylene group, a cyclopentylene group, a cyclohexylene group (such as 1,4-cyclohexylene group, 1,3-cyclohexylene group and 1,2-cyclohexylene group), a cycloheptylene group and a cyclooctylene group. Among these examples, preferred is an alicyclic hydrocarbon of which a hydrogen atom is not substituted. A cyclohexylene group is more preferable.

Among these Zs, the divalent heteroatom-containing group $Z^1$ is selected from a nitrogen-containing group, a sulfur-containing group, an oxygen-containing group and a phosphorus-containing group, and includes, for example, those as listed in the section of [Substituent group, etc.] among which a nitrogen-containing group and/or oxygen-containing group having double bond(s) is more preferable.

Examples of the divalent group $Z^1$ having double bond(s) include those as listed in the section of [Substituent group, etc.] of which a double bond(s) is contained.

Examples of the divalent nitrogen-containing group having a double bond includes an amide group, a urea group, a urethane group, an imide group, a carbodiimide group, an azo group, a pyridine group, an imidazole group, a toluidine group and a nitroalkyl group.

Examples of the divalent oxygen-containing groups having a double bond include a carboxy group, a carbonyl group, an ester group, an oxazole group, a carbamate group and a carbamoyl group.

Examples of the divalent sulfur-containing groups having double bonds include, for example, a thioester group, a thioamide group, a sulfonyl group, a sulfoxide group, a thiocarbonyl group, a thiourea group, a thiocarbamate group, a dithiocarbamate group, a thiophene group and a thiazole group.

Examples of the divalent phosphorus-containing groups having double bonds include, for example, a phosphate ester group and a phosphonic acid ester group.

Among these Zs, the divalent heteroatom $Z^2$ may, for example, be an oxygen atom or a sulfur atom among which the oxygen atom is more preferable.

Examples of the substituent group of which a hydrogen atom(s) in the divalent aliphatic hydrocarbon group X and/or in the divalent aromatic or alicyclic hydrocarbon group Y may be substituted include an aromatic group, an unsaturated group, a nitrogen-containing group, a sulfur-containing group, an oxygen-containing group, a phosphorus-containing group, an alicyclic group and a halogen atom. Specific examples of these include those as listed in the section of [Substituent group, etc.].

If a hydrogen atom(s) in the divalent aliphatic hydrocarbon group X and/or the divalent aromatic or alicyclic hydrocarbon group Y is/are substituted, the number of the substituent groups is not particularly limited and may, for example, be not larger than two, or not larger than one.

If a divalent aliphatic hydrocarbon group X is contained in the formula (j), "o" is preferably 1 to 3, more preferably 1 to 2, even more preferably 1; "p" is preferably 0 to 2, more preferably 0 to 1, even more preferably 0; and "q" is preferably 0 to 2, more preferably 0 to 1, even more preferably 0. Preferable examples of the formula (j) include —X—H, —X—Y—H, —Y—X—H, —X—Z—H, —X—Z—X—H, —X—Z—Y—H or —Y—Z—X—H.

If a divalent aromatic or alicyclic hydrocarbon group Y is contained in the formula (j), "p" is preferably 1 to 3, more preferably 1 to 2, even more preferably 1; "o" is preferably 0 to 2, more preferably 0 to 1; and "q" is preferably 0 to 2, more preferably 0 to 1, even more preferably 0. Preferable examples of the formula (j) include —Y—H, —Y—X—H, —X—Y—H, —Y—Z—H, —Y—Z—Y—H, —Y—Z—X—H, or —X—Z—Y—H.

In the formula (j) the number of Z, i.e., q is preferably 0 to 3, more preferably 0 to 2, even more preferably 0 to 1.

In formula (j), as a preferable example, $R^{12}$ contains a divalent aliphatic hydrocarbon group X of which a hydrogen atom is not substituted. In this case, in a preferred example, p and q of $R^{12}$ are 0. In another preferable example, $R^{12}$ contains a divalent aromatic or alicyclic hydrocarbon group Y of which a hydrogen atom is not substituted. In this case, in a preferred example, in $R^{12}$, p is 1, q is 0, and o is 0 or 1. In all of the cases, in a preferred example, q in $R^{12}$ is 1 or 2. In this case, in a preferred example, $R^{12}$ contains a divalent heteroatom-containing group $Z^1$ selected from either one of a nitrogen-containing group and an oxygen-containing group.

In formula (j), as a preferable example, $R^{12}$ contains a divalent aliphatic hydrocarbon group X of which o is 1 to 4. In this case, in a preferred example, o in $R^{12}$ is 1 or 2.

In formula (j), as a preferable example, $R^{12}$ contains a divalent aromatic or alicyclic hydrocarbon group Y of which p is 1 to 4. In this case, in a preferred example, p in $R^{12}$ is 1 or 2.

In formula (j), as a preferable example, $R^{12}$ contains a divalent heteroatom-containing group $Z^1$ of which q is 1 to 4, wherein said group $Z^1$ is selected from a nitrogen-containing group, a sulfur-containing group, an oxygen-containing group and a phosphorus-containing group. In this case, in a preferred example, q in $R^{12}$ is 1 or 2.

In formula (j), as a preferable example, $R^{12}$ contains a divalent aliphatic hydrocarbon group X of which o is 1 to 4, and a divalent aromatic or alicyclic hydrocarbon group Y of which p is 1 to 4. In this case, in a preferred example, in $R^{12}$, o is 1 or 2, and p is 1 or 2.

In formula (j), as a preferable example, $R^{12}$ contains a divalent aliphatic hydrocarbon group X of which o is 1 to 4, and a divalent heteroatom-containing group $Z^1$ of which q is 1 to 4, wherein said group $Z^1$ is selected from a nitrogen-containing group, an oxygen-containing group, a sulfur-containing group and a phosphorus-containing group. In this case, in a preferred example, in $R^{12}$, p is 1 or 2, and q is 1 or 2.

In formula (j), as a preferable example, $R^{12}$ contains a divalent aromatic or alicyclic hydrocarbon group Y of which p is 1 to 4, and a divalent heteroatom-containing group $Z^1$ of which q is 1 to 4, wherein said group $Z^1$ is selected from a nitrogen-containing group, an oxygen-containing group, a sulfur-containing group and a phosphorus-containing group. In this case, in a preferred example, in $R^{12}$, o is 1 or 2, and q is 1 or 2.

In formula (j), as a preferable example, $R^{12}$ contains a divalent aliphatic hydrocarbon group X of which o is 1 to 4, a divalent aromatic or alicyclic hydrocarbon group Y of which p is 1 to 4, and a divalent heteroatom-containing group $Z^1$ of which q is 1 to 4, wherein said group $Z^1$ is selected from a nitrogen-containing group, an oxygen-containing group, a sulfur-containing group and a phosphorus-containing group. In this case, in a preferred example, in $R^{12}$, o is 1 or 2, p is 1 or 2, and q is 1 or 2.

In formula (j), if $R^{12}$ contains a divalent aliphatic hydrocarbon group X of which o is 1 to 4, the X has 1 to 20 carbon atoms, preferably 1 to 12 carbon atoms, more preferably 1 to 7 carbon atoms.

In formula (j), if $R^{12}$ contains a divalent aromatic or alicyclic hydrocarbon group Y of which p is 1 to 4, the Y has preferably 6 to 20 carbon atoms, more preferably 6 to 14 carbon atoms.

In formula (j), if $R^{12}$ contains a divalent aliphatic hydrocarbon group X of which o is 1 to 4 and a divalent aromatic or alicyclic hydrocarbon group Y of which p is 1 to 4, the X has preferably 1 to 12 carbon atoms, more preferably 1 to 7 carbon atoms, and the Y has preferably 6 to 20 carbon atoms, more preferably 6 to 14 carbon atoms.

In formula (j), if $R^{12}$ contains a divalent aliphatic hydrocarbon group X of which o is 1 to 4 and a divalent heteroatom-containing group $Z^1$ selected from a nitrogen-containing group, an oxygen-containing group, a sulfur-containing group, and a phosphorus-containing group in which q is 1 to 4, it is preferable that o is 1 to 2 and q is 1 to 2, it is more preferable that o is 2 and q is 1, or that o is 1 and q is 2, and it is even more preferable that o is 1 and q is 1.

In formula (j), if $R^{12}$ contains a divalent aromatic or alicyclic hydrocarbon group Y of which p is 1 to 4, and a divalent heteroatom-containing group $Z^1$ selected from a nitrogen-containing group, an oxygen-containing group, a sulfur-containing group, and a phosphorus-containing group in which q is 1 to 4, it is preferable that p is 1 to 2 and q is 1 to 2, it is more preferable that p is 2 and q is 1, or that p is 1 and q is 2, and it is even more preferable that p is 1 and q is 1.

Regarding the 2-phenylbenzotriazole derivative according to the formula (I), at least one of the $R^1$ to $R^9$ is a thioether-containing group represented by the formula (i). Here, in terms of, for example, ease in practical synthesis, absorption characteristics, cost, and heat resistance, it is preferred that 1 to 2 of the $R^1$ to $R^9$ is/are a thioether-containing group represented by the formula (i), and it is more preferable that one of the $R^1$ to $R^9$ is a thioether-containing group represented by the formula (i).

There are no particular restrictions on the position of the monovalent sulfur-containing group represented by the formula (i) in the formula (I). The monovalent sulfur-containing group represented by the formula (i) is preferably positioned at any one of $R^6$ to $R^9$ in the formula (I), and the positions of $R^6$ and $R^9$ are more preferred.

In the formula (I), if $R^1$ to $R^9$ are groups other than the monovalent sulfur-containing group represented by the formula (i), they each represent a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group and a halogen atom.

When $R^1$ to $R^9$ are hydrocarbon groups, examples of such monovalent hydrocarbon groups include an aliphatic hydrocarbon group, an alicyclic hydrocarbon group and an aromatic hydrocarbon group. Among these groups, an aliphatic hydrocarbon group is preferred, examples of which being a linear or branched alkyl group, a linear or branched alkenyl group, and a linear or branched alkynyl group. Specific examples thereof include, although are not particularly limited to, a methyl group, ethane-1-yl group, propane-1-yl group, 1-methylethane-1-yl group, butane-1-yl group, butane-2-yl group, 2-methylpropane-1-yl group, 2-methylpropane-2-yl group, pentane-1-yl group, pentane-2-yl group, 2-methylbutane-1-yl group, hexane-1-yl group, 2-methylpentane-1-yl group, 3-methylpentane-1-yl group, heptane-1-yl group, 3-ethylpentane-1-yl group, 2-methylhexane-yl group, 3-methylhexane-yl group, octane-1-yl group, 2-methylheptane-1-yl group, 3-methylheptane-1-yl group, 4-methylheptane-1-yl group, 2-ethylhexane-1-yl group, 3-ethylhexane-1-yl group, 1,1,3,3-tetramethylbutyl nonane-1-yl group, 3-ethylheptane-1-yl group, 4-ethylheptane-1-yl group, 2-methyloctane-1-yl group, 3-methyloctane-1-yl group, 4-methyloctane-1-yl group, decane-1-yl group, 4-propylheptane-1-yl group, 3-ethyloctane-1-yl group, 4-ethyloctane-1-yl group, undecane-1-yl group, dodecane-1-yl group, 2-methylundecane-1-yl group, 2-ethyldecane-1-yl group, tridecane-1-yl group, tetradecane-1-yl group, pentadecane-1-yl group, hexadecane-1-yl group, heptadecane-1-yl group and octadecane-1-yl group. Among these groups, linear or branched alkyl groups having 1 to 8 carbon atoms are preferred, and linear or branched alkyl groups having 1 to 4 carbon atoms are more preferred.

When $R^1$ to $R^9$ are monovalent or divalent groups selected from an aromatic group, an unsaturated group, a sulfur-containing group, an oxygen-containing group, a phosphorus-containing group, an alicyclic group and a halogen atom, specific examples thereof include those as listed in the above section titled [Substituent group, etc.]. In the case of a divalent group, any two (preferably any adjacent two) of the $R^1$ to $R^9$ together form a ring.

In the formula (I), when the monovalent sulfur-containing group represented by the formula (i) is contained in $R^9$ at the 5-position, it is preferred that $R^6$, $R^7$ and $R^8$ are all hydrogen atoms for the groups other than the monovalent sulfur-containing group represented by the formula (i). Further, preferable examples of combinations of $R^1$, $R^2$, $R^3$, $R^4$ and $R^5$ are as follows.

[1] These include one or more substituent groups selected from: a hydrocarbon group having 1 to 18 carbon atoms (including hydrocarbon groups having 2 to 18 carbon atoms, such as an alkenyl group and an alkynyl group); a hydroxy group; an aromatic group having 6 to 18 carbon atoms; an ether group having 1 to 18 carbon atoms; an alkoxy group having 1 to 18 carbon atoms; an ester group having 1 to 18 carbon atoms; a (meth) acryloyloxy group and/or polyoxyethylene group having 1 to 20 carbon atoms; or a hydrocarbon group having 1 to 18 carbon atoms, in which hydrogen atoms may be substituted with, a base end may be interrupted, or carbon-carbon bonds may be interrupted by the above-mentioned substituent groups.

[2] In [1], the substituent groups are at least one selected from a hydrocarbon group having 1 to 10 carbon atoms, and a hydroxy group.

[3] In [2], the substituent groups are at least one selected from a hydrocarbon group having 1 to 8 carbon atoms, and a hydroxy group.

[4] In any of [1] to [3], the hydrocarbon groups as the substituent groups are linear or branched alkyl groups.

[5] In [4], the substituent groups are at least one selected from a methyl group, a t-butyl group and a hydroxy group.

[6] In [5], the substituent groups are at least one selected from a methyl group, a t-butyl group and a hydroxy group, provided that the number of hydroxy groups is not larger than 1.

[7] In any of [1] to [6], the number of the substituent groups is 2 to 4.

[8] In any of [1] to [7], the substituent groups are positioned at any of $R^1$ to $R^4$, and the rest of $R^1$ to $R^5$ are hydrogen atoms.

[9] In any of [1] to [8], the substituent groups are positioned at any of $R^1$, $R^2$ and $R^4$, and the rest of $R^1$ to $R^5$ are hydrogen atoms.

[10] In [9], $R^1$ is a hydroxy group, $R^2$ is a t-butyl group, $R^4$ is a methyl group, and $R^3$ and $R^5$ are hydrogen atoms.

In addition to the resin transparency owing to its compatibility of the 2-phenylbenzotriazole derivative, a resin member, obtained from the resin molding material that employs the 2-phenylbenzotriazole derivative containing the inventive thioether-containing group, is capable of absorbing a wavelength in a long-wavelength region while suppressing yellowing, due to the peak characteristics for ultraviolet absorption. Specifically, ultraviolet rays of a longer wavelength in the vicinity of 360 to 400 nm can be sharply cut even in the UV-A region without cutting 400 to 500 nm (visible range) due to the characteristics of the ultraviolet absorption capability. Therefore, there can be obtained a resin member having an excellent appearance with yellow coloration being suppressed. That is, due to the optical characteristics thereof, lights in a wavelength range of 250 to 400 nm (to 420 nm) can be sufficiently absorbed. Moreover, yellowing of the resin member can be suppressed due to the fact that the compound has a high ultraviolet absorption effect (molar extinction coefficient), that lights of such wavelengths can be sufficiently absorbed even when a small amount of the compound has been added, and that the slope of its absorption peak at 350 to 390 nm in a chloroform solution is larger than that of the conventional ultraviolet absorber. In order to obtain a resin member capable of absorbing harmful lights in a wide wavelength range up to 400 nm (up to 420 nm), suppressing the absorption of wavelength lights in the vicinity of 400 nm (to 420 nm) or higher which is a cause of yellowing, and having an excellent appearance with yellowing being suppressed, it is preferred that the absorption peak of lights in a 100 μM chloroform solution be 350 to 390 nm, more preferably 360 to 380 nm, and particularly preferably 360 to 375 nm. Further, it is preferred that the absorption peaks in these wavelength regions be the maximum absorption wavelength ($\lambda_{max}$). Furthermore, as for such wavelength peaks, in order to suppress the absorption of lights of wavelengths longer than those around 400 nm, a sharp absorption spectrum (i.e. larger absolute value of the slope) on the long-wavelength side is preferred, and the slope on the long-wavelength side of the absorption peak (the absolute value of the slope of the straight line connecting the absorption peak and the peak end of the absorption spectrum on the long-wavelength side) is preferably not smaller than 0.025, more preferably not smaller than 0.030, even more preferably not smaller than 0.040, particularly preferably not smaller than 0.042, and especially preferably not smaller than 0.043. Furthermore, in order for absorption to efficiently take place at a small amount, the molar extinction coefficient (maximum molar extinction coefficient: $\varepsilon\lambda_{max}$) of the absorption peak at the above range of 350 to 390 nm is preferably not smaller than 17,000 L/(mol·cm), more preferably not smaller than 18,000 L/(mol·cm), even more preferably not smaller than 20,000 L/(mol·cm), and particularly preferably not smaller than 21,000 L/(mol·cm).

When producing the benzotriazole compound represented by the formula (I), the following disclosures of the working examples and known techniques may be incorporated by reference although these are not particularly limited thereto.

(Resin Molding Material)

The resin molding material according to the present invention contains a resin and a 2-phenylbenzotriazole derivative that contains a thioether-containing group, and is an ingredient of a resin member, resin molded product or resin molded article or such. The resin molding material allows an ultraviolet absorber to have less sublimation when manufacturing or processing the resin molding material, or in a heating process such as hot-melt compounding of the same with other resins.

The resin molding material according to the invention is a resin molding material to be used in, for example, melt kneading, extrusion molding, injection molding, or blow molding. Examples thereof include, but are not particularly limited to, a pellet, a masterbatch or a compound which is an ingredient of a resin member, a resin compact or a resin molded article having ultraviolet absorption capability. These are preferably in a form of, although not limited to, powder, grain or cylindrical.

As the inventive resin molding material allows an ultraviolet absorber to have less sublimation when manufacturing the material by melt kneading, or when molding/processing the same by melt kneading, the material causes the molding or the processing apparatus to have less contamination thereinside, and suppress deterioration in ultraviolet absorption capability owing to the reduction of the ultraviolet absorber to thereby retain its ultraviolet absorption capability. Further, the material suppresses reduction in transparency in the case of transparent resin member.

Although not particularly limited, a conventionally-known resin such as thermoplastic resin or thermosetting resin may be widely employed for the resin of the resin molding material, and the thermoplastic or thermosetting resins include corresponding polymers that contain one type of repeated unit, or include corresponding copolymers that contain plural types of repeated units.

In the specific types of resin as described hereunder, the terms thermoplastic resin (polymer or copolymer) and thermosetting resin (polymer or copolymer) as used herein may refer to those including resins that contain not only repeated units as used in normal terminology in the resins but also other repeated units in an amount of not lager than 20 wt. %, preferably not larger than 15 wt %, more preferably not larger than 10 wt %, even more preferably not larger than 5%, still more preferably not larger than 2% based on the total amount of the resin. The term may also refer to those including a mixture of the specific types of resins and other resin, whereby the amount of the other resin is not larger than 20 wt. %, preferably not larger than 15 wt %, more preferably not larger than 10 wt %, even more preferably not larger than 5%, still more preferably not larger than 2% based on the total amount of the mixture.

Examples of the thermoplastic resin include, but are not limited to, polymers such as a (meth)acrylic-based resin, olefin-based resin, styrene-based resin, ester-based resin, ether-based resin, vinyl chloride-based resin, fluorocarbon-based resin, vinyl-based resin, polycarbonate-based resin, polyamide-based resin, polyimide-based resin, polyamideimide-based resin, polymaleimide-based resin, polyvinylpyrrolidone-based resin, polyurethane-based resin, polysulfone-based resin, polyphenylenesulfide-based resin and cycloolefin-based resin; and copolymers such as a butadiene-styrene-based copolymer, acrylonitrile-styrene-based copolymer, acrylonitrile-butadiene-styrene-based copolymer, styrene-isoprene-based copolymer, styrene-acrylic acid-based copolymer and vinyl chloride-vinylidene chloride-acrylonitrile-based copolymer.

Examples of the polymers as the thermoplastic resin will be described below, but shall not be limited to those.

Examples of the (meth)acrylic-based resins include, but are not limited to, poly(meth)acrylate, polymethyl(meth)acrylate, polyethyl(meth)acrylate, polybutyl(meth)acrylate and poly(methacrylonitrile).

Examples of the olefin-based resin include, but are not limited to, polyethylene, polypropylene, polybutene, polymethylpentene, polybutadiene, polyisoprene, poly(2,3-dimethyl butadiene), poly(cyclohexadiene), poly(cyclopentadiene), poly(dicyclopentadiene), polychloroprene, polynorbornene and cyclic olefin-based polymers.

Examples of the styrene-based resin include, but are not limited to, polystyrene.

Examples of the ester-based resin include, but are not limited to, polyethylene terephthalate, polybutylene terephthalate, polycyclohexylenedimethylene terephthalate, polyethylene naphthalate, polybutylene naphthalate, polycaprolactone, poly(ethylene succinate), polylactate, poly(malic acid) and polyglycolic acid.

Examples of the ether-based resin include, but are not limited to, polyacetal, polyphenylene ether, polyetherketone, polyetheretherketone, polyetherketoneketone, polyetheretherketoneketone, polyether sulfone and polyetherimide.

Examples of the vinyl chloride-based resin include, but are not limited to, polyvinyl chloride and polyvinylidene chloride.

Examples of the fluorocarbon-based resin include, but are not limited to, polytetrafluoroethylene, polyvinyl fluoride and polyvinylidene fluoride.

Examples of the vinyl-based resin include, but are not limited to, polyvinyl acetate, polyvinyl alcohol, poly (vinyl sulfonic acid) and their salts.

Examples of the polycarbonate-based resin include, but are not limited to, polycarbonate.

Examples of the polyamide-based resin include, but are not limited to, polyamide, nylon 6, nylon 66, nylon 11 and nylon 12.

Examples of the polyimide-based resin include, but are not limited to, polyimide.

Examples of the polyamideimide-based resin include, but are not limited to, polyamide imide.

Examples of the polymaleimide-based resin include, but are not limited to, polymaleimide, poly(N-phenylmaleimide).

Examples of the polyvinylpyrrolidone-based resin include, but are not limited to, polyvinylpyrrolidone.

Examples of the polyurethane-based resin include, but are not limited to, polyurethane.

Examples of the polysulfone-based resin include, but are not limited to, polysulfone.

Examples of the polyphenylenesulfide-based resin include, but are not limited to, a polyphenylenesulfide resin.

Examples of the cycloolefin-based resin include, but are not limited to, a cycloolefin polymer.

Copolymers of thermoplastic resins are not particularly limited to but include those that contain a multiple of raw monomers of the above-mentioned polymers. The examples of which are as described below.

Examples of the butadiene-styrene-based copolymer include, but are not particularly limited to, butadiene-styrene copolymer.

Examples of the acrylonitrile-styrene-based copolymer include, but are not particularly limited to, acrylonitrile-styrene copolymer.

Examples of the acrylonitrile-butadiene-styrene-based copolymer include, but are not particularly limited to, acrylonitrile-butadiene-styrene copolymer.

Examples of the styrene-isoprene-based copolymer include, but are not particularly limited to, a styrene-isoprene copolymer.

Examples of the styrene-acrylic acid-based copolymers include, but are not particularly limited to, a styrene-acrylic acid copolymer.

Examples of the vinyl chloride-vinylidene chloride-acrylonitrile-based copolymers include, but are not particularly limited to, vinyl chloride-vinylidene chloride-acrylonitrile copolymer.

Examples of the thermosetting resin include, but are not particularly limited to, polymers such as a phenol-based resin, urea-formaldehyde-based resin, melamine-based resin, unsaturated polyester-based resin, alkyd-based resin, epoxy-based resin and episulfide-based resin; and copolymers such as an acrylic melamine-based resin and acrylic urethane-based resin.

Polymers of the thermosetting resin include, but are not particularly limited to, the followings.

Examples of the phenol-based resin include, but are not particularly limited to, a phenol resin.

Examples of the urea-formaldehyde-based resin include, but are not particularly limited to, a urea-formaldehyde resin.

Examples of the melamine-based resin include, but are not particularly limited to, a melamine resin.

Examples of the unsaturated polyester-based resin include, but are not particularly limited to, an unsaturated polyester resin.

Examples of the alkyd-based resin include, but are not particularly limited to, an alkyd resin.

Examples of the epoxy-based resin include, but are not particularly limited to, an epoxy resin.

Examples of the episulfide-based resin include, but are not particularly limited to, an episulfide resin.

Copolymers of the thermosetting resin include, but are not particularly limited to, the followings.

Examples of the acrylic melamine-based resin include, but are not particularly limited to, an acrylic melamine resin.

Examples of the acrylic urethane-based resin include, but are not particularly limited to, an acrylic urethane resin.

Among the above resins, thermoplastic resins are particularly preferable, which include, but not are particularly limited to, the resins as listed above.

Among these, preferred are a styrene-based resin (polystyrene), ether-based resin (polyacetal), (meth)acrylic-based resin (acrylic resin), cycloolefin-based resin (cycloolefin polymer), polycarbonate-based resin (polycarbonate), polyphenylenesulfide-based resin, polyamide-based resin (polyamide), acrylonitrile-butadiene-styrene-based copolymer (acrylonitrile-butadiene-styrene copolymer resin) and ester-based resin (polyethylene terephthalate); more preferred are a styrene-based resin (polystyrene), (meth)acrylic-based resin ((meth)acrylate resin), cycloolefin-based resin (cycloolefin polymer), polycarbonate-based resin (polycarbonate), acrylonitrile-butadiene-styrene-based copolymer (acrylonitrile-butadiene-styrene copolymer resin) and ester-based resin (polyethylene terephthalate resin); even more preferred are a styrene-based resin (polystyrene), (meth)acrylic-based resin (acrylic resin), cycloolefin-based resin (cycloolefin polymer) and polycarbonate-based resin (polycarbonate); and particularly more preferred are a styrene-based resin (polystyrene), (meth)acrylic-based resin (acrylic resin) and cycloolefin-based resin (cycloolefin polymer).

Here, additives used for ordinary resin molding may be added, and examples of which include, but are not particularly limited to, an infrared absorber, an ultraviolet absorber, a high refractive index agent, an antioxidant, a light stabilizer, a flame retardant and a plasticizer.

To produce it under the melt condition, kneading machines may be employed to perform melt-compounding with the aid of an extruder or to perform melt-compounding with the aid of a kneader. Regarding the melt-compounding performed with the aid of the extruder, there may be employed one or more extruders such as single-screw extruder, twin-screw extruder, another multiple-screw extruder and twin-screw/single-screw composite extruder.

There are no particular restrictions on a method for melt-compounding the inventive resin molding material and then molding the resin member, the resin molded product or the resin molded article, but the method may be any method as long as the resin and the ultraviolet absorber are mixed with each other under a thermal environment at a temperature of not smaller than the melting temperature of the resin, and such method may be, although not limited thereto, for example, an injection molding method, an extrusion molding method, a calendar molding method, a blow molding method or a compression molding method. In the case of resin member in a form of the film, if an extruder is used, the resin member can be produced by forming a film with an extruder; or by producing a raw material with an extruder at first, and then stretching such raw material to one or two axes so as to form a film.

As the inventive resin molding material employs an ultraviolet absorber that is less prone to sublimation, the material is advantageous in that the material causes facilities to be less contaminated in a process where the ultraviolet absorber is melt compounded by heat under thermal environment into a resin or such to obtain a resin molding material (first processing) and then the resin molding material containing the ultraviolet absorber and, optionally, other type(s) of resin or the like are melt compounded by heat to obtain a resin member, a resin molded product or a resin molded article (second processing), or in a process where the resultant resin member, resin molded product and/or resin molded article are thermally processed from the inventive resin molding material. Further, the inventive resin molding material employs an ultraviolet absorber less prone to sublimation to suppress weight loss in the ultraviolet absorber in a resin processing and/or a resin molding step(s) that require a high temperature of not smaller than 200° C. to thereby exert or retain ultraviolet absorption capability.

The content of the 2-phenylbenzotriazole derivative containing a thioether-containing group in the inventive resin molding material is not particularly limited. This content may be in a range similar to that of a content of the ultraviolet absorber in a conventional resin molding material. For example, the content may be not smaller than 0.4 weight %, not smaller than 10 weight % or not smaller than 30 weight % based on the total weight of the resin molding material. The content also may be not larger than 70 weight % or not larger than 50 weight %.

WORKING EXAMPLES

Hereinbelow, the invention will be explained in more detail by means of working examples, but the invention shall not be limited to these working examples.

1. Synthesis of Ultraviolet Absorber

<Synthesis Example 1> Synthesis of Compound 1

[Chemical formula 10]

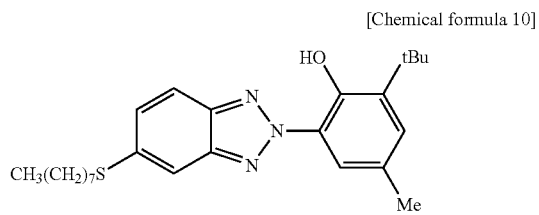

2-(2-hydroxy-3-tert-butyl-5-methylphenyl)-5-chlorobenzotriazole (50.0 g, 0.158 mol), octanethiol (46.3 g, 0.316 mol), potassium carbonate (48.1 g, 0.348 mol) and potassium iodide (1.8 g, 0.011 mol) were reacted in 125 g of DMF at 125° C. for 12 hours. After the reaction was completed, the pH was adjusted, followed by performing filtration, methanol washing, water washing, and recrystallization to obtain a compound 1.

FT-IR(KBr): 2956 cm$^{-1}$: O—H stretching vibration 1445, 1392 cm$^{-1}$: triazole ring stretching vibration 662 cm$^{-1}$: C—S stretching vibration $^1$H-NMR (CDCl$_3$ 400 MHz): δ 0.89 (t, 3H, C$\underline{H}_3$(CH$_2$)$_7$—S), 1.33 (m, 8H, CH$_3$(C$\underline{H}_2$)$_4$(CH$_2$)$_3$—S), 1.49 (m, 11H, -Ph-OH—CH$_3$—C(C$\underline{H}_3$)$_3$, $\overline{C}$H$_3$(CH$_2$)$_4$C$\underline{H}_2$(CH$_2$)$_2$—S), 1.73 (quin, 2H, $\overline{C}$H$_3$(CH$_2$)$_5$C$\underline{H}_2$CH$_2$—S), 2.38 (s, 3H, -Ph-OH—C$\underline{H}_3$—C(CH$_3$)$_3$), $\overline{3.02}$ (t, 2H, CH$_3$(CH$_2$)$_5$CH$_2$C$\underline{H}_2$—S), $\overline{7}$.16 (s, 1H), 7.36 (d, 1H), 7.69 (s, 1H), 7.78 (d, $\overline{1}$H), 8.04 (s, 1H), (insg. 5 arom. CH), 11.62 (s, 1H, -Ph-OH—CH$_3$—C(CH$_3$)$_3$)

$^{13}$C-NMR (CDCl$_3$ 400 MHz): δ 14.0 ($\underline{C}$H$_3$(CH$_2$)$_7$—S), 20.9 (-Ph-OH—$\underline{C}$H$_3$—C(CH$_3$)$_3$), 22.6 $\overline{(C}$H$_3$$\underline{C}$H$_2$(CH$_2$)$_5$CH$_2$—S), 28.7 $(\overline{C}$H$_3$$\underline{C}$H$_2$(CH$_2$)$_4$CH$_2$CH$_2$—S), $\overline{29}$.5 (-Ph-OH—CH$_3$—$\underline{C}$(CH$_3$)$_3$), 31.8 (-Ph-OH—CH$_3$—C($\underline{C}$H$_3$)$_3$), 33.8 (CH$_3$($\overline{C}$H$_2$)$_5$$\underline{C}$H$_2$CH$_2$—S), 35.4 (C$\overline{H}_3$(CH$_2$)$_5$CH$_2$$\underline{C}$H$_2$—S), 113.6, 117.5, 119.3, 128.7, 129.2 ($\underline{C}$H$_{arom}$), 125.$\overline{4}$, 141.2, 143.4 ($\underline{C}_{arom}$), 128.3 ($\underline{C}_{arom}$—CH$_3$), 138.0 ($\underline{C}_{arom}$—S), 139.1 ($\underline{C}_{arom}$—C(CH$_3$)$_3$), $\overline{14}$6.7 ($\underline{C}_{arom}$—OH)

<Synthesis Example 2> Synthesis of Compound 2

[Chemical formula 11]

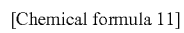

2-(2-hydroxy-3-tert-butyl-5-methylphenyl)-5-chlorobenzotriazole (25.0 g, 79.2 mmol), benzenethiol (17.4 g, 158.3 mmol), potassium carbonate (24.1 g, 174.2 mmol) and potassium iodide (0.9 g, 5.5 mmol) were reacted in 62.5 g of DMF at 125° C. for 12 hours. After the reaction was completed, the pH was adjusted, followed by performing filtration, methanol washing, water washing, recrystallization, and column purification to obtain a compound 2.

FT-IR(KBr): 3000 cm$^{-1}$: O—H stretching vibration 1445, 1390 cm$^{-1}$: triazole ring stretching vibration 665 cm$^{-1}$: C—S stretching vibration $^1$H-NMR (CDCl$_3$ 400 MHz): δ1.48 (s, 9H, -Ph-OH—CH$_3$—C(C$\underline{H}_3$)$_3$), 2.37 (s, 3H, -Ph-OH—C$\underline{H}_3$—C(CH$_3$)$_3$), 7.16 (s, 1H), 7.38 (d, 4H), 7.48 (s, 2H), 7.68 (s, 1H), 7.83 (d, 1H), 8.03 (d, 1H), (insg. 10 arom. C$\underline{H}$), 11.55 (s, 1H, -Ph-O$\underline{H}$—CH$_3$—C(CH$_3$)$_3$)

$^{13}$C-NMR (CDCl$_3$ 400 MHz): δ20.9 (-Ph-OH—$\underline{C}$H$_3$—C(CH$_3$)$_3$), 29.5 (-Ph-OH—CH$_3$—C($\underline{C}$H$_3$)$_3$), 35.4 (-P$\overline{h}$-OH—CH$_3$—$\underline{C}$(CH$_3$)$_3$), 116.8, 118.0, 119.3, 128.3, 128.8, 129.6, 132.7 ($\overline{C}$H$_{arom}$), 125.5, 141.2, 143.2 ($\underline{C}_{arom}$), 129.8 ($\underline{C}_{arom}$—CH$_3$), 139.2 ($\underline{C}_{arom}$—S), 139.2 (S—$\underline{C}_{arom}$), 139.2 ($\underline{C}_{arom}$—C(CH$_3$)$_3$), 146.7 ($\underline{C}_{arom}$—OH)

<Synthesis Example 3> Synthesis of Compound 3

[Chemical formula 12]

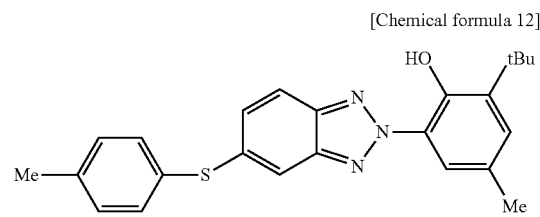 [SMILES: Cc1ccc(Sc2ccc3nn(-c4cc(C)cc(C(C)(C)C)c4O)nc3c2)cc1]

2-(2-hydroxy-3-tert-butyl-5-methylphenyl)-5-chlorobenzotriazole (25.0 g, 79.2 mmol), p-toluenethiol (19.7 g, 158.3 mmol), potassium carbonate (24.1 g, 174.2 mmol) and potassium iodide (0.92 g, 5.54 mmol) were reacted in 62.5 g of DMF at 125° C. for 12 hours. After the reaction was completed, the pH was adjusted, followed by performing filtration, methanol washing, water washing, recrystallization, and column purification to obtain a compound 3.

FT-IR(KBr): 3000 cm$^{-1}$: O—H stretching vibration 1444, 1389 cm$^{-1}$: triazole ring stretching vibration 667 cm$^{-1}$: C—S stretching vibration $^1$H-NMR (CDCl$_3$ 400 MHz): δ1.48 (s, 9H, -Ph-OH—CH$_3$—C(C$\underline{H}_3$)$_3$), 2.37 (s, 3H, -Ph-OH—C$\underline{H}_3$—C(CH$_3$)$_3$), 2.40 (s, 3H, C$\underline{H}_3$-Ph-S—), 7.16 (s, 1H), 7.23 $\overline{(}$s, 2H), 7.32 (d, 1H), 7.43 (s, $\overline{2}$H), 7.56 (s, 1H), 7.81 (d, 1H), 8.02 (d, 1H), (insg. 9 arom. C$\underline{H}$), 11.56 (s, 1H, -Ph-O$\underline{H}$—CH$_3$—C(CH$_3$)$_3$)

$^{13}$C-NMR (CDCl$_3$ 400 MHz): δ20.9 $\overline{(}$-Ph-OH—$\underline{C}$H$_3$—C(CH$_3$)$_3$), 21.2 ($\underline{C}$H$_3$-Ph-S—), 29.5 (-Ph-OH—$\overline{C}$H$_3$—$\underline{C}$(CH$_3$)$_3$), 35.4 (-$\overline{P}$h-OH—CH$_3$—$\underline{C}$(CH$_3$)$_3$), 115.3, 117.8, 119.3, 128.7, 129.3 130.5, 133.7 ($\overline{C}$H$_{arom}$), 125.4, 141.2, 143.4 ($\underline{C}_{arom}$), 128.3 ($\underline{C}_{arom}$—CH$_3$), 138.9 ($\underline{C}_{arom}$—S), 138.7 (S—$\underline{C}_{arom}$), 139.1 ($\underline{C}_{arom}$—C(CH$_3$)$_3$), 146.7 ($\underline{C}_{arom}$—OH)

<Synthesis Example 4> Synthesis of Compound 4

[Chemical formula 13]

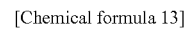

2-(2-hydroxy-3-tert-butyl-5-methylphenyl)-5-chlorobenzotriazole (25.0 g, 79.2 mmol), 4-isopropylbenzenethiol (24.1 g, 158.3 mmol), potassium carbonate (24.1 g, 174.2 mmol) and potassium iodide (0.92 g, 5.54 mmol) were reacted in 62.5 g of DMF at 125° C. for 12 hours. After the reaction was completed, the pH was adjusted, followed by performing filtration, methanol washing, water washing, recrystallization, and column purification to obtain a compound 4.

FT-IR(KBr): 3000 cm$^{-1}$: O—H stretching vibration 1446, 1389 cm$^{-1}$: triazole ring stretching vibration 666 cm$^{-1}$: C—S stretching vibration $^1$H-NMR (CDCl$_3$ 400 MHz): δ1.30 (d, 6H, (C$\underline{H}_3$)$_2$CH-Ph-S—), 1.48 (s, 9H, -Ph-OH—CH$_3$—C(C$\underline{H}_3$)$_3$), 2.37 (s, 3H, -Ph-OH—C$\underline{H}_3$—C(CH$_3$)$_3$), 2.95 (m, 1$\underline{H}$, (CH$_3$)$_2$C$\underline{H}$-Ph-S—), 7.16 (s, 1H), 7.28 (s, 2H), 7.36 (d, 1H), 7.45 (s, 2H), 7.57 (s, 1H), 7.81 (d, 1H), 8.02 (d, 1H), (insg. 9 arom. C$\underline{H}$), 11.58 (s, 1H, -Ph-O$\underline{H}$—CH$_3$—C(CH$_3$)$_3$)

$^{13}$C-NMR (CDCl$_3$ 400 MHz): δ20.9 (-Ph-OH—$\underline{C}$H$_3$—C(CH$_3$)$_3$), 23.9 (($\underline{C}$H$_3$)$_2$CH-Ph-S—), 29.5 (-Ph-OH—CH$_3$—C($\underline{C}$H$_3$)$_3$), 33.9 (($CH_3$)$_2$$\underline{C}$H-Ph-S—), 35.4 (-Ph-OH—CH$_3$—$\underline{C}$(CH$_3$)$_3$), 115.3, 117.8, 119.3, 127.9, 128.7, 129.2, 129.6, 133.6 (CH$_{arom}$), 125.4, 141.4, 143.3 ($C_{arom}$), 128.3 ($\underline{C}_{arom}$—CH$_3$), 138.5 ($\underline{C}_{arom}$—S), 138.5 (S—$\underline{C}_{arom}$), 139.1 ($\underline{C}_{arom}$—C(CH$_3$)$_3$), 146.7 ($\underline{C}_{arom}$—OH), 149.7 ($\underline{C}_{arom}$—CH)

<Synthesis Example 5> Synthesis of Compound 5

[Chemical formula 14]

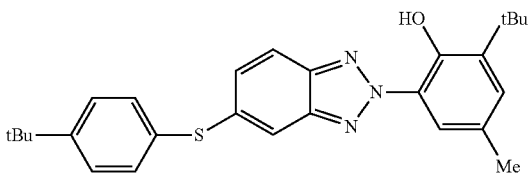

2-(2-hydroxy-3-tert-butyl-5-methylphenyl)-5-chlorobenzotriazole (25.0 g, 79.2 mmol), 4-tert-butylbenzenethiol (26.3 g, 158.3 mmol), potassium carbonate (24.1 g, 174.2 mmol) and potassium iodide (0.9 g, 5.5 mmol) were reacted in 62.5 g of DMF at 125° C. for 12 hours. After the reaction was completed, the pH was adjusted, followed by performing filtration, methanol washing, water washing, recrystallization, and column purification to obtain a compound 5.

FT-IR(KBr): 3000 cm$^{-1}$: O—H stretching vibration 1444, 1390 cm$^{-1}$: triazole ring stretching vibration 668 cm$^{-1}$: C—S stretching vibration $^1$H-NMR (CDCl$_3$ 400 MHz): δ1.36 (s, 9H, —S-Ph-C(C$\underline{H}_3$)$_3$), 1.48 (s, 9H, -Ph-OH—CH$_3$—C(C$\underline{H}_3$)$_3$), 2.37 (s, 3H, -Ph-OH—C$\underline{H}_3$—C(CH$_3$)$_3$), 7.16 (s, 1H), 7.35 (d, 1H), 7.44 (s, 4H), 7.59 (s, 1H), 7.81 (d, 1H), 8.02 (d, 1H), (insg. 9 arom. C$\underline{H}$), 11.58 (s, 1H, -Ph-O$\underline{H}$—CH$_3$—C(CH$_3$)$_3$)

$^{13}$C-NMR (CDCl$_3$ 400 MHz): δ20.9 (-Ph-OH—$\underline{C}$H$_3$—C(CH$_3$)$_3$), 29.5 (-Ph-OH—CH$_3$—C($\underline{C}$H$_3$)$_3$), 31.3 (—S-Ph-C($\underline{C}$H$_3$)$_3$), 34.8 (—S-Ph-$\underline{C}$(CH$_3$)$_3$), 35.4 (-Ph-OH—CH$_3$—$\underline{C}$(CH$_3$)$_3$), 115.4, 117.8, 119.3, 126.8, 128.8, 129.2, 133.2 (CH$_{arom}$), 125.4, 141.5, 143.3 ($C_{arom}$), 128.3 ($\underline{C}_{arom}$—CH$_3$), 138.5 ($\underline{C}_{arom}$—S), 138.5 (S—$\underline{C}_{arom}$), 139.1, 152.0 ($\underline{C}_{arom}$—C(CH$_3$)$_3$), 146.7 ($\underline{C}_{arom}$—OH)

<Synthesis Example 6> Synthesis of Compound 6

[Chemical formula 15]

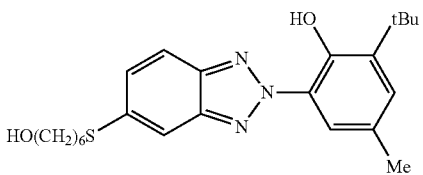

2-(2-hydroxy-3-tert-butyl-5-methylphenyl)-5-chlorobenzotriazole (18.82 g 59.6 mmol), 6-mercapto-1-hexanol (12.00 g 89.4 mmol), potassium carbonate (18.21 g 131.1 mmol) and, potassium iodide (0.69 g 4.17 mmol) were heated and stirred in 60 mL of DMF at 135 to 140° C. for 10 hours. After the reaction was completed, the pH was adjusted, followed by performing filtration, methanol washing, recrystallization, and column purification to obtain a compound 6.

FT-IR(KBr): 2956 cm$^{-1}$: O—H stretching vibration 1445, 1392 cm$^{-1}$: triazole ring stretching vibration 662 cm$^{-1}$: C—S stretching vibration $^1$H-NMR (CDCl$_3$ 400 MHz): δ 1.49 (m, 17H, -Ph-OH—CH$_3$—C(C$\underline{H}_3$)$_3$, HOCH$_2$(C$\underline{H}_2$)$_3$CH$_2$CH$_2$—S), 1.78 (quin, 2H, HO(CH$_2$)$_4$C$\underline{H}_2$CH$_2$—S), 2.38 (s, 3H, -Ph-OH—C$\underline{H}_3$—C(CH$_3$)$_3$), 3.03 (t, 2H, HO(CH$_2$)$_5$C$\underline{H}_2$—S), 3.65 (t, 2H, HOC$\underline{H}_2$(CH$_2$)$_5$—S), 7.16 (s, 1H), 7.37 (d, 1H), 7.70 (s, 1H), 7.78 (d, 1H), 8.04 (s, 1H), (insg. 5 arom. C$\underline{H}$), 11.58 (s, 1H, -Ph-O$\underline{H}$—CH$_3$—C(CH$_3$)$_3$)

$^{13}$C-NMR (CDCl$_3$ 400 MHz): δ 20.9 (-Ph-OH—$\underline{C}$H$_3$—C(CH$_3$)$_3$), 25.3 (HO(CH$_2$)$_3$$\underline{C}$H$_2$(CH$_2$)$_2$—S), 28.7 (HO$\underline{C}$H$_2$(CH$_2$)$_2$($CH_2$)$_3$—S), 29.5 (-Ph-OH—CH$_3$—C($\underline{C}$H$_3$)$_3$), 32.6 (-Ph-OH—CH$_3$—$\underline{C}$(CH$_3$)$_3$), 33.2 (HO(CH$_2$)$_4$$\underline{C}$H$_2$CH$_2$—S), 35.4 (HO(CH$_2$)$_5$$\underline{C}$H$_2$—S), 62.8 (HO$\underline{C}$H$_2$(CH$_2$)$_5$—S), 113.8, 117.6, 119.3, 128.6, 129.3 ($\underline{C}$H$_{arom}$), 125.4, 141.2, 143.4 ($C_{arom}$), 128.3 ($\underline{C}_{arom}$—CH$_3$), 137.8 ($\underline{C}_{arom}$—S), 139.1 ($\underline{C}_{arom}$—C(CH$_3$)$_3$), 146.7 ($\underline{C}_{arom}$—OH)

<Synthesis Example 7> Synthesis of Compound 7

[Chemical formula 16]

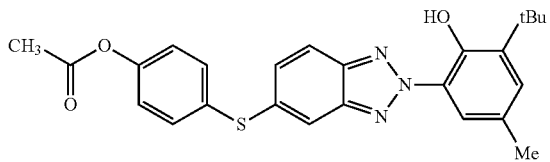 [SMILES: CC(=O)Oc1ccc(Sc2ccc3nn(-c4cc(C)cc(C(C)(C)C)c4O)nc3c2)cc1]

2-(2-hydroxy-3-tert-butyl-5-methylphenyl)-5-chlorobenzotriazole (25.0 g 79.2 mmol), 4-hydroxybenzenethiol (20.0 g 158.3 mmol), potassium carbonate (24.1 g, 174.2 mmol) and potassium iodide (0.92 g 5.54 mmol) were heated and stirred in 66 mL of DMF at 125° C. for 12 hours. After the reaction was completed, the pH was adjusted, followed by performing filtration, methanol washing, water washing, recrystallization, and column purification to obtain an intermediate 1 as a light-yellow solid.

Intermediate 1 (0.40 g 0.99 mmol), acetyl chloride (0.16 g 1.97 mmol) and triethylamine (0.17 g 2.18 mmol) were stirred in 30 mL of methylene chloride for 18 hours at room temperature. After the reaction was completed, water and chloroform were added, and then acid treatment and water washing thereof were performed, and the organic layer was evaporated to obtain a crude product. The crude product thus obtained was subjected to column purification and recrystallization to obtain Compound 7 as a light-yellow solid.

FT-IR(KBr): 2968 cm$^{-1}$: O—H stretching vibration 1762 cm$^{-1}$: C═O stretching vibration 1448, 1367 cm$^{-1}$: triazole ring stretching vibration $^1$H-NMR (CDCl$_3$ 400 MHz): δ 1.48 (s, 9H, -Ph-OH—CH$_3$—C(C$\underline{H}_3$)$_3$), 2.32 (s, 3H, C$\underline{H}_3$—C═O—O—), 2.37 (s, 3H, -Ph-OH—C$\underline{H}_3$—C(CH$_3$)$_3$), 7.12 (d, 2H), 7.17 (s, 1H), 7.35 (d, 1H), 7.48 (d, 2H), 7.70 (s, 1H), 7.82 (d, 1H), 8.04 (s, 1H), (insg. 9 arom. C$\underline{H}$), 11.54 (s, 1H, -Ph-O$\underline{H}$—CH$_3$—C(CH$_3$)$_3$)

$^{13}$C-NMR (CDCl$_3$ 400 MHz): δ 20.9 (-Ph-OH—$\underline{C}$H$_3$—C(CH$_3$)$_3$), 21.1 (-Ph-OH—CH$_3$—$\underline{C}$(CH$_3$)$_3$), 29.5 (-Ph-OH—CH$_3$—C($\underline{C}$H$_3$)$_3$), 35.4 ($\underline{C}$H$_3$—C(=O)—O—), 116.9, 118.1, 119.4, 122.9, 128.9, 129.7, 133.9 ($\underline{C}$H$_{arom}$), 125.4, 141.7, 143.2 ($\underline{C}_{arom}$), 128.3 ($\underline{C}_{arom}$—$\underline{C}$H$_3$), 130.9 ($\underline{C}_{arom}$—S), 137.1 ($\underline{C}_{arom}$—S), 139.2 ($\underline{C}_{arom}$—C(CH$_3$)$_3$), 146.7 ($\underline{C}_{arom}$—OH), 150.8 ($\underline{C}_{arom}$—O—), 169.1 (CH$_3$—$\underline{C}$(=O)—O—)

<Synthesis Example 8> Synthesis of Compound 8

[Chemical formula 17]

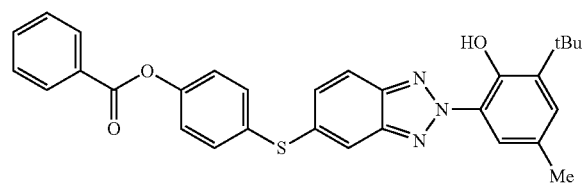 [SMILES: Cc1cc(-n2nc3ccc(Sc4ccc(OC(=O)c5ccccc5)cc4)cc3n2)c(O)c(C(C)(C)C)c1]

Intermediate 1 (0.40 g 0.99 mmol), benzoyl chloride (0.28 g 1.97 mmol) and triethylamine (0.17 g 2.18 mmol) were stirred in 30 mL of methylene chloride for 18 hours at room temperature. After the reaction was completed, water and chloroform were added, and acid treatment and water washing thereof were performed, and the organic layer was evaporated to obtain a crude product. The crude product thus obtained was subjected to column purification and recrystallized to obtain compound 8 as a light-yellow solid. Physical property values thereof are shown below:

FT-IR(KBr): 2962 cm$^{-1}$: O—H stretching vibration 1738 cm$^{-1}$: C=O stretching vibration 1487, 1355 cm$^{-1}$: triazole ring stretching vibration $^1$H-NMR (CDCl$_3$ 400 MHz): δ 1.49 (s, 9H, -Ph-OH—CH$_3$—C(C$\underline{H}_3$)$_3$), 2.37 (s, 3H, -Ph-OH—C$\underline{H}_3$—C(CH$_3$)$_3$), 7.16 (s, 2H), 7.25 (d, 2H), 7.36 (d, 1H), 7.50–7.56 (m, 4H), 7.63 (t, 1H), 7.72 (s, 1H), 8.04 (s, 1H), 8.20 (d, 1H), (insg. 14 arom. C$\underline{H}$), 11.56 (s, 1H, -Ph-O$\underline{H}$—CH$_3$—C(CH$_3$)$_3$)

$^{13}$C-NMR (CDCl$_3$ 400 MHz): δ20.9 (-Ph-OH—$\underline{C}$H$_3$—C(CH$_3$)$_3$), 29.5 (-Ph-OH—CH$_3$—C($\underline{C}$H$_3$)$_3$), 35.4 (-Ph-OH—CH$_3$—$\underline{C}$(CH$_3$)$_3$), 116.9, 118.1, 119.4, 123.1, 128.7, 128.9, 129.7, 130.2, 133.8, 134.0 ($\underline{C}$H$_{arom}$), 125.4, 141.7, 143.2 ($\underline{C}_{arom}$), 128.3 ($\underline{C}_{arom}$—$\underline{C}$H$_3$), 129.3 ($\underline{C}_{arom}$—C(=O)—O—Ph), 131.0 ($\underline{C}_{arom}$—S), 137.1 ($\underline{C}_{arom}$—S), 139.2 ($\underline{C}_{arom}$—C(CH$_3$)$_3$), 146.8 ($\underline{C}_{arom}$—OH), 151.1 (Ph-C(=O)—O—$\underline{C}_{arom}$), 164.9 (Ph-$\underline{C}$(=O)—O—)

<Synthesis Example 9> Synthesis of Compound 9

[Chemical formula 18]

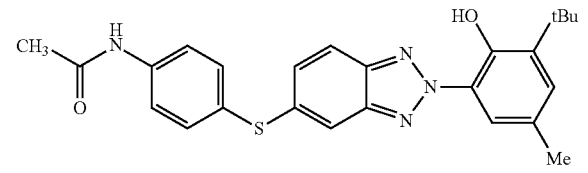

2-(2-hydroxy-3-tert-butyl-5-methylphenyl)-5-chlorobenzotriazole (3.15 g 9.97 mmol), 4-acetamidothiophenol, 2.50 g 14.96 mmol), potassium carbonate (3.03 g 21.94 mmol) and potassium iodide (0.12 g 0.7 mmol) were reacted in 30 g of DMF at 135° C. for 12 hours. After the reaction was completed, pH was adjusted, and then filtering and washing with water were performed, followed by performing recrystallization thereof several times to obtain a compound 9 as a yellow solid. Physical property values thereof are shown below.

FT-IR(KBr): FT-IR(KBr): 2963 cm$^{-1}$: O—H stretching vibration 1653 cm$^{-1}$: C=O stretching vibration 1445, 1396 cm$^{-1}$: triazole ring stretching vibration $^1$H-NMR (CDCl$_3$ 400 MHz): δ 1.48 (s, 9H, -Ph-OH—CH$_3$—C(C$\underline{H}_3$)$_3$), 2.21 (s, 3H, C$\underline{H}_3$—C=O—NH—), 2.37 (s, 3H, -Ph-OH—C$\underline{H}_3$—C(CH$_3$)$_3$), 7.17 (s, 1H), 7.31 (d, 1H), 7.48 (d, 2H), 7.56 (d, 3H), 7.79 (d, 1H), 8.02 (s, 1H), (insg. 9 arom. C$\underline{H}$), 11.54 (s, 1H, -Ph-O$\underline{H}$—CH$_3$—C(CH$_3$)$_3$)

$^{13}$C-NMR (CDCl$_3$ 400 MHz): δ 20.9 (-Ph-OH—$\underline{C}$H$_3$—C(CH$_3$)$_3$), 24.7 (-Ph-OH—CH$_3$—$\underline{C}$(CH$_3$)$_3$), 29.5 (-Ph-OH—CH$_3$—C($\underline{C}$H$_3$)$_3$), 35.4 ($\underline{C}$H$_3$—C(=O)—NH—), 115.6, 117.9, 119.3, 120.7, 127.9, 128.8, 134.5 ($\underline{C}$H$_{arom}$), 125.4, 141.5, 143.2 ($\underline{C}_{arom}$), 128.3 ($\underline{C}_{arom}$—$\underline{C}$H$_3$), 129.1 ($\underline{C}_{arom}$—S), 138.4 ($\underline{C}_{arom}$—S), 138.2 ($\underline{C}_{arom}$—$\underline{N}$H), 139.2 ($\underline{C}_{arom}$—C(CH$_3$)$_3$), 146.7 ($\underline{C}_{arom}$—OH), 168.3 (CH$_3$—$\underline{C}$(=O)—NH—)

<Synthesis Example 10> Synthesis of Compound 10

[Chemical formula 19]

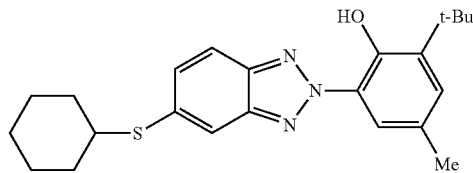

2-(2-hydroxy-3-tert-butyl-5-methylphenyl)-5-chlorobenzotriazole (32.3 g, 0.102 mol), cyclohexanethiol (23.8 g, 0.205 mol), potassium carbonate (31.1 g, 0.225 mol) and potassium iodide (1.2 g, 0.007 mol) were reacted in 100 g of DMF at 125° C. for 12 hours. After the reaction was completed, pH was adjusted, followed by performing filtration, MeOH washing, water washing, and recrystallization to obtain a compound 10.

FT-IR(KBr): 2930 cm$^{-1}$: O—H stretching vibration 1450, 1391 cm$^{-1}$: triazole ring stretching vibration 667 cm$^{-1}$: C—S stretching vibration $^1$H-NMR (CDCl$_3$ 400 MHz): δ 1.40 (m, 4H, CH$_2$(C$\underline{H}_2$)$_2$(CH$_2$)$_2$CH—S), 1.49 (S, 9H, -Ph-OH—CH$_3$—C(C$\underline{H}_3$)$_3$), 1.54 (m, 2H, C$\underline{H}_2$(CH$_2$)$_2$(CH$_2$)$_2$CH—S), 1.83 (m, 2H, CH$_2$(CH$_2$)$_2$CH$_2$C$\underline{H}_2$CH—S), 2.06 (m, 2H, CH$_2$(CH$_2$)$_2$C$\underline{H}_2$CH$_2$CH—S), 2.38 (s, 3H, -Ph-OH—C$\underline{H}_3$—C(CH$_3$)$_3$), 3.29 (m, 1H, CH$_2$CH$_2$CH$_2$C$\underline{H}$—S), 7.17 (s, 1H), 7.43 (d, 1H), 7.80 (s, 1H), 7.84 (d, 1H), 8.06 (d, 1H), (insg. 5 arom. C$\underline{H}$), 11.62 (s, 1H, -Ph-O$\underline{H}$—CH$_3$—C(CH$_3$)$_3$)

$^{13}$C-NMR (CDCl$_3$ 400 MHz): δ 20.9 (-Ph-OH—$\underline{C}$H$_3$—C(CH$_3$)$_3$), 25.7 (CH$_2$($\underline{C}$H$_2$)$_2$(CH$_2$)$_2$CH—S), 26.0 ($\underline{C}$H$_2$(CH$_2$)$_2$(CH$_2$)$_2$CH—S), 29.5 (-Ph-OH—CH$_3$—C($\underline{C}$H$_3$)$_3$), 33.1 (CH$_2$(CH$_2$)$_2$(CH$_2$)$_2$CH—S), 35.4 (-Ph-OH—CH$_3$—$\underline{C}$(CH$_3$)$_3$), 46.3 ($\underline{C}$H(CH$_2$)$_2$(CH$_2$)$_2$CH—S), 117.2, 117.5, 119.3, 128.3, 128.8 ($\underline{C}$H$_{arom}$), 141.5, 143.2 ($\underline{C}_{arom}$), 125.4

($\underline{C}_{arom}$—N), 131.2 ($\underline{C}_{arom}$—CH$_3$), 136.1 ($\underline{C}_{arom}$—S), 139.1 ($\underline{C}_{arom}$—C(CH$_3$)$_3$), 146.7 ($\underline{C}_{arom}$—OH)

<Synthesis Example 11> Synthesis of Compound 11

[Chemical formula 20]

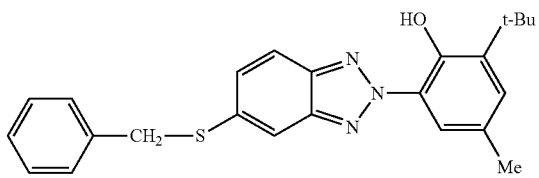

2-(2-hydroxy-3-tert-butyl-5-methylphenyl)-5-chlorobenzotriazole (20.0 g, 63.3 mmol), benzyl mercaptan (15.7 g, 126.6 mmol), potassium carbonate (19.3 g, 139.4 mmol) and potassium iodide (0.74 g, 4.5 mmol) were reacted in 50.0 g of DMF at 125° C. for 9 hours. After the reaction was completed, pH was adjusted, followed by performing filtration, MeOH washing, water washing, and recrystallization to obtain a compound 11.

FT-IR(KBr): 2960 cm$^{-1}$: O—H stretching vibration 1441, 1392 cm$^{-1}$: triazole ring stretching vibration 664 cm$^{-1}$: C—S stretching vibration $^1$H-NMR (CDCl$_3$ 400 MHz): δ1.49 (s, 9H, -Ph-OH—CH$_3$—C(C$\underline{H}_3$)$_3$), 2.38 (s, 3H, -Ph-OH—C$\underline{H}_3$—C(CH$_3$)$_3$), 4.24 (s, 2H, Ph-C$\underline{H}_2$—S—), 7.16 (s, 1H), 7.26~7.38 (m, 6H), 7.72 (s, 1H), 7.80 (d, 1H), 8.04 (d, 1H), (insg. 10$_{arom}$·CH), 11.58 (s, 1H, -Ph-O$\underline{H}$—CH$_3$—C(CH$_3$)$_3$)

$^{13}$C-NMR (CDCl$_3$ 400 MHz): δ20.9 (-Ph-OH—$\underline{C}H_3$—C(CH$_3$)$_3$), 29.5 (-Ph-OH—CH$_3$—C($\underline{C}H_3$)$_3$), 35.4 (-Ph-OH—CH$_3$—$\underline{C}$(CH$_3$)$_3$), 38.6 (Ph-$\underline{C}H_2$—S—), 115.4, 117.6, 119.3, 128.7, 128.8, 128.8, 129.7, 137.0 ($\underline{C}H_{arom}$), 125.4, 141.4, 143.4 ($\underline{C}_{arom}$), 128.3 ($\underline{C}_{arom}$—CH$_3$), 136.5 ($\underline{C}_{arom}$ CH$_2$—S—), 138.7 (S—$\underline{C}_{arom}$), 139.1 ($\underline{C}_{arom}$—C(CH$_3$)$_3$), 146.7 ($\underline{C}_{arom}$—OH)

<Synthesis Example 12> Synthesis of Compound 12

[Chemical formula 21]

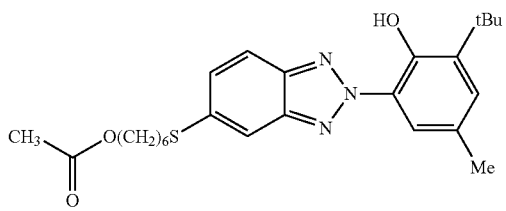

The above compound 6 (0.50 g 1.21 mmol), acetyl chloride (0.18 g 0.18 mmol) and triethylamine (0.19 g 2.46 mmol) were stirred in 15 mL of methylene chloride for 18 hours at room temperature. After the reaction was completed, water and chloroform were added, and then acid treatment and water washing thereof were performed, and the organic layer was evaporated to obtain a crude product. The crude product thus obtained was subjected to column purification and recrystallization to obtain compound 12 as a light-yellow solid. Physical property values thereof are shown below:

FT-IR(KBr): 3011 cm$^{-1}$: O—H stretching vibration 1744 cm$^{-1}$: C═O stretching vibration 1448, 1361 cm$^{-1}$: triazole ring stretching vibration $^1$H-NMR (CDCl$_3$ 400 MHz): δ 1.49 (s, 9H, -Ph-OH—CH$_3$—C(C$\underline{H}_3$)$_3$), 2.05 (s, 3H, C$\underline{H}_3$—C═O—O—), 2.39 (s, 3H, -Ph-OH—C$\underline{H}_3$—C(CH$_3$)$_3$), 3.28 (t, 2H, —C═O—O—CH$_2$C$\underline{H}_2$—S), 4.33 (t, 2H, —C═O—O—C$\underline{H}_2$CH$_2$—S), 7.18 (d, 2H), 7.74 (s, 1H), 7.83 (d, 1H), 7.87 (s, 1H), 8.06 (s, 1H), (insg. 5 arom. C$\underline{H}$), 11.62 (s, 1H, -Ph-O$\underline{H}$—CH$_3$—C(CH$_3$)$_3$)

$^{13}$C-NMR (CDCl$_3$ 400 MHz): δ 20.8 (-Ph-OH—$\underline{C}H_3$—C(CH$_3$)$_3$), 20.9 (-Ph-OH—CH$_3$—$\underline{C}$(CH$_3$)$_3$), 29.6 (-Ph-OH—CH$_3$—C($\underline{C}H_3$)$_3$), 32.2 (—C═O—O—CH$_2$$\underline{C}H_2$—S), 35.4 (CH$_3$—$\underline{C}$(═O)—O—), 62.5 (—C═O—O—$\underline{C}H_2$CH$_2$—S), 115.8, 118.0, 119.4, 128.4, 135.8 ($\underline{C}H_{arom}$), 125.4, 141.6, 143.3 ($\underline{C}_{arom}$), 128.9 ($\underline{C}_{arom}$—CH$_3$), 129.7 ($\underline{C}_{arom}$—S), 139.2 ($\underline{C}_{arom}$—C(CH$_3$)$_3$), 146.8 ($\underline{C}_{arom}$—OH), 170.7 (CH$_3$—$\underline{C}$═O—O—)

<Synthesis Example 13> Synthesis of Compound 13

[Chemical formula 22]

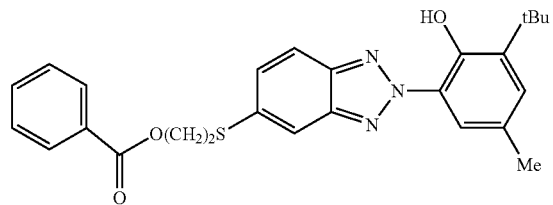

2-(2-hydroxy-3-tert-butyl-5-methylphenyl)-5-chlorobenzotriazole (18.82 g 59.6 mmol), 2-mercaptoethanol (6.98 g 89.4 mmol), potassium carbonate (18.21 g 131.1 mmol) and potassium iodide (0.69 g 4.17 mmol) were heated and stirred in 60 mL of DMF for 10 hours at 135 to 140° C. After the reaction was completed, pH was adjusted, followed by performing filtration, MeOH washing, and recrystallization to obtain an intermediate 2 as a light-yellow solid. Intermediate 2 (2.00 g 5.59 mmol), benzoyl chloride (1.18 g 8.39 mmol), and triethylamine (0.89 g 11.19 mmol) were stirred in 30 mL of methylene chloride for 18 hours at room temperature. After the reaction was completed, water and chloroform were added, and acid treatment and water washing thereof were performed, and the organic layer was evaporated to obtain a crude product. The crude product thus obtained was subjected to column purification and recrystallized to obtain compound 13 as a light-yellow solid. Physical property values thereof are shown below:

FT-IR(KBr): 2963 cm$^{-1}$: O—H stretching vibration 1719 cm$^{-1}$: C═O stretching vibration 1449, 1357 cm$^{-1}$: triazole ring stretching vibration $^1$H-NMR (CDCl$_3$ 400 MHz): δ 1.50 (s, 9H, -Ph-OH—CH$_3$—C(C$\underline{H}_3$)$_3$), 2.39 (s, 3H, -Ph-OH—C$\underline{H}_3$—C(CH$_3$)$_3$), 3.41 (t, 2H, —C═O—O—CH$_2$C$\underline{H}_2$—S), 4.59 (t, 2H, —C═O—O—C$\underline{H}_2$CH$_2$—S) 7.19 (s, 1H), 7.38 (t, 2H), 7.45 (d, 1H), 7.50 (t, 1H), 7.81 (d, 1H), 7.91~7.96 (m, 3H), 8.05 (s, 1H), (insg. 10 arom. C$\underline{H}$), 11.54 (s, 1H, -Ph-O$\underline{H}$—CH$_3$—C(CH$_3$)$_3$)

$^{13}$C-NMR (CDCl$_3$ 400 MHz): δ 20.9 (-Ph-OH—$\underline{C}H_3$—C(CH$_3$)$_3$), 29.6 (-Ph-OH—CH$_3$—C($\underline{C}H_3$)$_3$), 32.5 (—C═O—O—CH$_2$$\underline{C}H_2$—S), 35.4 (-Ph-OH—CH$_3$—$\underline{C}$(CH$_3$)$_3$), 63.4 (—C═O—O—$\underline{C}H_2$CH$_2$—S) 116.3, 118.0, 119.4, 128.3, 128.9, 129.8, 133.1, 135.8 (CH$_{arom}$), 125.4, 141.6, 143.3 ($\underline{C}_{arom}$), 128.3 (C$_{arom}$—$\underline{C}$H$_3$), 129.7 ($\underline{C}_{arom}$—S), 139.2 ($\underline{C}_{arom}$—C(CH$_3$)$_3$), 146.8 ($\underline{C}_{arom}$—OH), 166.3 (Ph-$\underline{C}$(=O)—O—)

<Synthesis Example 14> Synthesis of Compound 14

[Chemical formula 23]

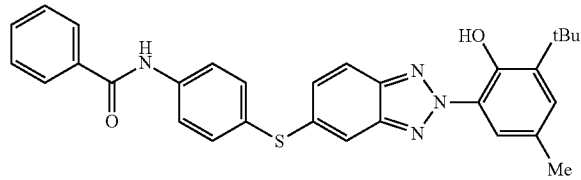

2-(2-hydroxy-3-tert-butyl-5-methylphenyl)-5-chlorobenzotriazole (5.00 g 15.8 mmol), 4-Aminobenzenethiol (2.97 g 23.8 mmol), potassium carbonate (4.81 g, 34.8 mmol) and potassium iodide (0.18 g 1.11 mmol) were reacted in 30 g of DMF at 135° C. for 3 hours. After the reaction was completed, pH was adjusted, followed by performing filtration, water washing, MeOH washing, and recrystallization to obtain an intermediate 3 as a light-yellow solid. Intermediate 3 (0.50 g 1.24 mmol) and benzoyl chloride (0.26 g 1.86 mmol) were stirred in 10 mL of methylene chloride for 18 hours at room temperature. After the reaction was completed, methanol was added to the reaction solution, and the precipitate was filtered to obtain a yellow crude product. The crude product thus obtained was recrystallized to obtain compound 14 as a light-yellow solid. Physical property values thereof are shown below:

FT-IR(KBr): FT-IR(KBr): 2955 m$^{-1}$: O—H stretching vibration 1654 cm$^{-1}$: C=O stretching vibration 1449, 1396 cm$^{-1}$: triazole ring stretching vibration $^1$H-NMR (CDCl$_3$ 400 MHz): δ1.48 (s, 9H, -Ph-OH—CH$_3$—C(C$\underline{H}_3$)$_3$), 2.37 (s, 3H, -Ph-OH—C$\underline{H}_3$—C(CH$_3$)$_3$), 7.90 (m, 1$\underline{H}$, Ph-C(=O)N$\underline{H}$—), 7.16 (s, 1$\underline{H}$), 7.33 (d, 1H), 7.50-7.57 (m, 5H), 7.63 (s, 1H), 7.73 (d, 2H), 7.82 (d, 1H), 7.90 (m, 2H), 8.04 (s, 1H), (insg. 14 arom. C$\underline{H}$), 11.55 (s, 1H, -Ph-O$\underline{H}$—CH$_3$—C(CH$_3$)$_3$)

$^{13}$C-NM$\overline{R}$ (CDCl$_3$ 400 MHz): δ20.9 (-Ph-OH—$\underline{C}$H$_3$—C(CH$_3$)$_3$), 29.5 (-Ph-OH—CH$_3$—C($\underline{C}$H$_3$)$_3$), 35.4 (-P$\overline{h}$-OH—CH$_3$—$\underline{C}$(CH$_3$)$_3$), 115.8, 118.0, 11$\overline{9}$.3, 121.1, 127.0, 128.4, 128.9, $\overline{1}$32.1, 134.5 ($\underline{C}$H$_{arom}$), 125.4, 141.5, 143.2 ($\underline{C}_{arom}$), 128.3 (C$_{arom}$—$\underline{C}$H$_3$), 128.8 ($\underline{C}_{arom}$—C(=O)NH—), 129.2 ($\underline{C}_{arom}$—S), 1$\overline{3}$8.1 ($\underline{C}_{arom}$—S), 138.5 (Ph-$\underline{C}$(=O)NH—$\underline{C}_{arom}$), 139.2 ($\underline{C}_{arom}$—C(CH$_3$)$_3$), 146.8 ($\underline{C}_{arom}$—OH), 165.7 (Ph-$\underline{C}$(=O)N$\overline{H}$—)

<Synthesis Example 15> Synthesis of Compound 15

[Chemical formula 24]

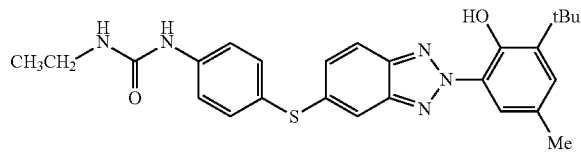

Intermediate 3 (1.00 g 2.47 mmol) and ethyl isocyanate (1.18 g 16.54 mmol) were heated and stirred in 20 mL of DMF for 16 hours at 100° C. After the reaction was completed, toluene and water were added, and subjected to washing with water, and the organic layer was distilled off under reduced pressure to obtain a yellow solid. The crude product thus obtained was subjected to column purification and recrystallized to synthesize a light-yellow solid compound 15. Physical property values thereof are shown below:

FT-IR(KBr): FT-IR(KBr): 2968 cm$^{-1}$: O—H stretching vibration 1639 cm$^{-1}$: C=O stretching vibration 1436, 1392 cm$^{-1}$: triazole ring stretching vibration $^1$H-NMR (CDCl$_3$ 400 MHz): δ1.13 (t, 3H, C$\underline{H}_3$CH$_2$—NH—C(=O)NH—), 1.41 (s, 9H, -Ph-OH—CH$_3$—C(C$\underline{H}_3$)$_3$), 2.30 (m, 3H, -Ph-OH—C$\underline{H}_3$—C(CH$_3$)$_3$), 3.26 (quin, 2H, CH$_3$C$\underline{H}_2$—NH—C(=O)NH—), 4.63 (m, 1H, CH$_3$CH$_2$—NHC(=O)N$\underline{H}$—), 6.31 (m, 1H, CH$_3$CH$_2$—N$\underline{H}$C(=O)NH—), 7.08 (s, 1H), 7.23 (d, 1H), 7.30 (d, 2H), 7.38 (m, 2H), 7.49 (d, 1H), 7.71 (s, 1H), 7.95 (s, 1H), (insg. 9 arom. C$\underline{H}$), 11.47 (s, 1H, -Ph-O$\underline{H}$—CH$_3$—C(CH$_3$)$_3$)

$^{13}$C-NMR (CDCl$_3$ 400 MHz): δ14.1 ($\underline{C}$H$_3$CH$_2$—HNC(=O)NH—), 20.9 (-Ph-OH—$\underline{C}$H$_3$—C(C$\overline{H}_3$)$_3$), 29.5 (-Ph-OH—CH$_3$—C($\underline{C}$H$_3$)$_3$), 35.4 (-Ph-OH—CH$_3$—$\underline{C}$(CH$_3$)$_3$), 35.4 (CH$_3$$\underline{C}$H$_2$—HNC(=O)NH—), 115.3, 11$\overline{7}$.9, 119.3, 121.1, 126.$\overline{2}$, 128.8, 134.9 ($\underline{C}$H$_{arom}$), 125.3, 141.4, 143.2 ($\underline{C}_{arom}$), 128.3 ($\underline{C}_{arom}$—$\underline{C}$H$_3$), 128.9 ($\underline{C}_{arom}$—S), 138.7 ($\underline{C}_{arom}$—S), 139.1 ($\underline{C}_{arom}$—C(CH$_3$)$_3$), 139.1 ($\underline{C}_{arom}$—NH), 146.7 ($\underline{C}_{arom}$—OH), 154.8 (CH$_3$CH$_2$—HN$\underline{C}$(=O)NH—)

<Synthesis Example 16> Synthesis of Compound 16

[Chemical formula 25]

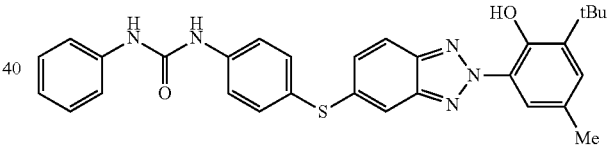

Intermediate 3 (1.00 g 2.47 mmol) and phenyl isocyanate (0.31 g 2.60 mmol) were heated and stirred in 20 mL of DMF for 8 hours at 100° C. After the reaction was completed, water was added and the precipitated crystals were filtered to obtain a yellow solid. The crude product thus obtained was subjected to column purification and recrystallized to synthesize a light-yellow solid compound 16. Physical property values thereof are shown below:

FT-IR(KBr): FT-IR(KBr): 2961 cm$^{-1}$: O—H stretching vibration 1659 cm$^{-1}$: C=O stretching vibration 1444, 1396 cm$^{-1}$: triazole ring stretching vibration $^1$H-NMR (CDCl$_3$ 400 MHz): δ1.48 (s, 9H, -Ph-OH—CH$_3$—C(C$\underline{H}_3$)$_3$), 2.36 (s, 3H, -Ph-OH—C$\underline{H}_3$—C(CH$_3$)$_3$), 6.60 (m, 1$\underline{H}$, -Ph-NHC(=O)N$\underline{H}$—), 6.73 (m, 1H, -Ph-N$\underline{H}$C(=O)NH—), 7.16 (m, 2H), 7.32 (d, 1H), 7.38 (m, 4H), 7.44 (m, 4H), 7.57 (s, 1H), 7.80 (d, 1H), 8.02 (s, 1H), (insg. 14 arom. C$\underline{H}$), 11.55 (s, 1H, -Ph-O$\underline{H}$—CH$_3$—C(CH$_3$)$_3$)

$^{13}$C-NMR (CDCl$_3$ 400 MHz): δ20.9 (-Ph-OH—$\underline{C}$H$_3$—C(CH$_3$)$_3$), 29.5 (-Ph-OH—CH$_3$—C($\underline{C}$H$_3$)$_3$), 35.4 (-P$\overline{h}$-OH—CH$_3$—$\underline{C}$(CH$_3$)$_3$), 115.5, 117.9, 119.3, 121.1, 121.9, 128.8, 129.0, $\overline{1}$29.7, 129.6, 134.7 (CH$_{arom}$), 125.0, 141.5, 143.2 ($\underline{C}_{arom}$), 128.3 ($\underline{C}_{arom}$—$\underline{C}$H$_3$), 125.4 (Ph-S—$\underline{C}_{arom}$), 127.2 ($\underline{C}_{arom}$—S-Ph), 139.1 ($\underline{C}_{arom}$—C(CH$_3$)$_3$), 137.5 (Ph-HN—

C(=O)—NH—C̲$_{arom}$), 138.4 (C̲$_{arom}$—HN—C(=O)—NH-Ph), 146.7 (C̲$_{arom}$—OH), 152.7 (—HN—C̲(=O)—NH—)

As for compound 17, a reagent manufactured by Tokyo Chemical Industry Co., Ltd. was used.

Compounds 18 to 21 were obtained in a method as described in JP-A-H9-95658.

2. Optical Properties of Ultraviolet Absorber

Compounds 1 to 17 were each dissolved in chloroform at 100 μM, followed by housing each in a 10-mm quartz cell, and then using an ultraviolet-visible spectrophotometer (V-550 by JASCO Corporation) to measure an absorption spectrum thereof (FIGS. 1 to 4).

The absolute value of the slope on the long-wavelength side of an absorption peak in a wavelength region of 350 to 390 nm was obtained by the following formula (Tables 1A and 1B), with a point of intersection between the absorption spectrum of the absorption peak of each compound on the long-wavelength side and a baseline (line at which the slope of an absorption spectrum in 400 to 500 nm is 0) serving as a peak end (e.g. FIG. 1).

|Slope on long-wavelength side of absorption peak in wavelength region of 350 to 390 nm=(Absorbance at peak end−Absorbance at absorption peak in wavelength region of 350 to 390 nm)/(Absorption wavelength at peak end−Wavelength at absorption peak in wavelength region of 350 to 390 nm)|

Further, a molar extinction coefficient was calculated by the following formula (Tables 1A and 1B), after reading the absorbance at the absorption peak (maximum absorption wavelength: $\lambda_{max}$) in the wavelength region of 350 to 390 nm.

Molar extinction coefficient: $\varepsilon_{max}$(L/(mol·cm))=$A$: Absorbance/[$c$: Molar concentration (mol/L)×$l$: Cell optical path length (cm)]

Each of the compounds 1 to 16, as compared to a comparative example 17 which is a general long-wavelength absorption-type ultraviolet absorber, has an absorption peak of a maximum absorption wavelength in 360 to 375 nm, and is superior in ultraviolet absorption ability in the long-wavelength region, and the absolute value of the slope on the long-wavelength side of the absorption peak of each of these compounds is not smaller than 0.030; particularly, the slopes of the compounds 2, 4, 5, 6, 7, 8, 9, 12, 13, 14, 15 and 16 were all not smaller than 0.040, and the slopes of the compounds 4, 5, 6, 14, 15 and 16 were all not smaller than 0.042, which indicated that a high yellowing suppression effect can be achieved for resin molding materials and resin members. As for molar extinction coefficient, the compounds 1 to 16 each exhibited a value of not smaller than 20,000 L/(mol·cm); it was found that an ultraviolet in the long-wavelength region can be absorbed with the usage of a smaller amount and more efficiently, as compared to the compound 17, which indicated a high yellowing suppression effect.

TABLE 1A

| | Structural formula | Wave length at absorption peak in wavelength region of 350 to 390 nm (maximum absorption wavelength: $\lambda_{max}$) [nm] | Molar extinction coefficient at peak in the left column (maximum molar extinction coefficient: $\varepsilon_{max}$) [L/(mol·cm)] | Absorbance at absorption peak in wavelength region of 350 to 390 nm | Absorbance at peak end | Absorption wavelength at peak end [nm] | Absolute value of slope of absorption peak on long wavelength side in wavelength region of 350 to 390 nm |
|---|---|---|---|---|---|---|---|
| Working example 1 Compound 1 | | 367.5 | 21400 | 2.14 | 0.00147 | 426.0 | 0.037 |
| Working example 2 Compound 2 | | 367.5 | 25500 | 2.55 | 0.00053 | 429.0 | 0.041 |
| Working example 3 Compound 3 | | 369.0 | 21500 | 2.15 | 0.00429 | 426.5 | 0.037 |
| Working example 4 Compound 4 | | 369.0 | 25100 | 2.51 | 0.00011 | 428.5 | 0.042 |
| Working example 5 Compound 5 | | 368.5 | 25300 | 2.53 | 0.00017 | 427.5 | 0.043 |

TABLE 1A-continued

| Working example | Compound | Structural formula | Wave length at absorption peak in wavelength region of 350 to 390 nm (maximum absorption wavelength: $\lambda_{max}$) [nm] | Molar extinction coefficient at peak in the left column (maximum molar extinction coefficient: $\varepsilon_{max}$) [L/(mol · cm)] | Absorbance at absorption peak in wavelength region of 350 to 390 nm | Absorbance at peak end | Absorption at wavelength long wavelength side peak at end [nm] | Absolute value of slope of absorption peak on wavelength long wavelength side in wavelength region of 350 to 390 nm |
|---|---|---|---|---|---|---|---|---|
| Working example 6 | Compound 6 | | 368.5 | 23000 | 2.30 | 0.00432 | 423 | 0.042 |
| Working example 7 | Compound 7 | | 366.0 | 22400 | 2.24 | 0.01899 | 422.0 | 0.040 |
| Working example 8 | Compound 8 | | 366.0 | 22900 | 2.29 | 0.02244 | 422.0 | 0.041 |
| Working example 9 | Compound 9 | | 369.0 | 22400 | 2.24 | 0.00955 | 424.0 | 0.041 |

TABLE 1B

| Working example | Compound | Structural formula | Wave length at absorption peak in wave length region of 350 to 390 nm (maximum absorption wavelength: $\lambda_{max}$) [nm] | Molar extinction coefficient at peak in the left column (maximum molar extinction coefficient: $\varepsilon_{max}$) [L/(mol·cm)] | Absorbance at absorption peak in wavelength region of 350 to 390 nm | Absorbance at peak end | Absorption wavelength at peak end [nm] | Absolute value of slope of absorption peak on long wavelength side in wavelength region of 350 to 390 nm |
|---|---|---|---|---|---|---|---|---|
| Working example 10 | Compound 10 | (benzotriazole with HO, t-Bu, Me phenyl; S-cyclohexyl substituent) | 367.5 | 21100 | 2.11 | 0.00768 | 426.0 | 0.036 |
| Working example 11 | Compound 11 | (benzotriazole with HO, t-Bu, Me phenyl; CH₂–S–phenyl substituent) | 366.0 | 20100 | 2.01 | 0.03400 | 428.0 | 0.032 |
| Working example 12 | Compound 12 | (benzotriazole with HO, tBu, Me phenyl; O(CH₂)₆S–C(=O)CH₃ substituent) | 365.0 | 22200 | 2.22 | 0.03020 | 419.0 | 0.040 |
| Working example 13 | Compound 13 | (benzotriazole with HO, tBu, Me phenyl; O(CH₂)₆S–C(=O)–phenyl substituent) | 365.0 | 22100 | 2.21 | 0.02594 | 419.0 | 0.040 |

TABLE 1B-continued

| | Compound | Structural formula | Wave length at absorption peak in wave length region of 350 to 390 nm (maximum absorption wavelength: $\lambda_{max}$) [nm] | Molar extinction coefficient at peak in the left column (maximum molar extinction coefficient: $\varepsilon_{max}$) [L/(mol·cm)] | Absorbance at absorption peak in wavelength region of 350 to 390 nm | Absorbance at peak end | Absorption wavelength at peak end [nm] | Absolute value of slope of absorption peak on long wavelength side in wavelength region of 350 to 390 nm |
|---|---|---|---|---|---|---|---|---|
| Working example 14 | Compound 14 | | 369.0 | 23400 | 2.34 | 0.01418 | 424.0 | 0.043 |
| Working example 15 | Compound 15 | | 370.0 | 22700 | 2.27 | 0.01740 | 424.0 | 0.042 |
| Working example 16 | Compound 16 | | 369.0 | 23900 | 2.39 | 0.01868 | 425.0 | 0.042 |
| Comparative example 1 | Compound 17 | | 353.0 | 15300 | 1.53 | 0.00517 | 423.0 | 0.022 |

3. Sublimation Evaluation A of Ultraviolet Absorber

Compounds 1 to 17 were each placed on a glass slide of 0.01 g and 18 mm×18 mm. This glass slide was placed on a melting-point measuring apparatus, and on both sides of the slide glass were placed glass tubes on top of which a cover glass (upper cover glass) of 18 mm×18 mm was further placed to secure a clearance of 2-3 mm between the glass slide and the cover glass in order to make test samples for sublimation evaluation.

These test samples were heated to 260° C. at about 10° C./min while observing compound adherence to the upper cover glass at the respective temperatures, which was evaluated based on the following criteria.

◯: No sublimation observed (No crystal precipitation was observed on the upper cover glass), x: Sublimation observed (Crystal precipitation was observed on the upper cover glass).

Tables 2A and 2B show the evaluation results. Compound 17 of conventional ultraviolet absorber exhibited crystal adherence on the upper cover glass at 180° C. The adhered compound was subjected to NMR measurement. The result showed a chart similar to that of compound 17, exhibiting no change in its structure, thus indicating a sublimation of compound 17. Meanwhile, no sublimation or adherence of the compounds 1 to 16 to the cover glasses was observed even in a high-temperature condition at 260° C. These results indicate that the ultraviolet absorbers containing the thioether group in working examples have a superior effect of suppressing in-machine contamination which is caused by sublimation, and are excellent in retaining optical properties of the molding materials during first and second processing of the resin, and also during thermal processing to be performed thereafter.

TABLE 2A

| Working example | Compound | Structural formula | Heating temperature (° C.) | | | | | | | | | | | | |
|---|---|---|---|---|---|---|---|---|---|---|---|---|---|---|---|
| | | | 150 | 160 | 170 | 180 | 190 | 200 | 210 | 220 | 230 | 240 | 250 | 260 |
| Working example 17 | Compound 1 | Benzotriazole with CH₃(CH₂)₇S– substituent and 2-(2-hydroxy-3-t-Bu-5-Me-phenyl) group | ◯ | ◯ | ◯ | ◯ | ◯ | ◯ | ◯ | ◯ | ◯ | ◯ | ◯ | ◯ |
| Working example 18 | Compound 2 | Benzotriazole with phenyl-S– substituent and 2-(2-hydroxy-3-t-Bu-5-Me-phenyl) group | ◯ | ◯ | ◯ | ◯ | ◯ | ◯ | ◯ | ◯ | ◯ | ◯ | ◯ | ◯ |
| Working example 19 | Compound 3 | Benzotriazole with (4-Me-phenyl)-S– substituent and 2-(2-hydroxy-3-t-Bu-5-Me-phenyl) group | ◯ | ◯ | ◯ | ◯ | ◯ | ◯ | ◯ | ◯ | ◯ | ◯ | ◯ | ◯ |
| Working example 20 | Compound 4 | Benzotriazole with (4-i-Pr-phenyl)-S– substituent and 2-(2-hydroxy-3-t-Bu-5-Me-phenyl) group | ◯ | ◯ | ◯ | ◯ | ◯ | ◯ | ◯ | ◯ | ◯ | ◯ | ◯ | ◯ |
| Working example 21 | Compound 5 | Benzotriazole with (4-t-Bu-phenyl)-S– substituent and 2-(2-hydroxy-3-t-Bu-5-Me-phenyl) group | ◯ | ◯ | ◯ | ◯ | ◯ | ◯ | ◯ | ◯ | ◯ | ◯ | ◯ | ◯ |
| Working example 22 | Compound 6 | Benzotriazole with HO–(CH₂)₆–S– substituent and 2-(2-hydroxy-3-tBu-5-Me-phenyl) group | ◯ | ◯ | ◯ | ◯ | ◯ | ◯ | ◯ | ◯ | ◯ | ◯ | ◯ | ◯ |

TABLE 2A-continued

| Working example | Compound | Structural formula | Heating temperature (° C.) | | | | | | | | | | | |
|---|---|---|---|---|---|---|---|---|---|---|---|---|---|---|
| | | | 150 | 160 | 170 | 180 | 190 | 200 | 210 | 220 | 230 | 240 | 250 | 260 |
| Working example 23 | Compound 7 | (structure) | ○ | ○ | ○ | ○ | ○ | ○ | ○ | ○ | ○ | ○ | ○ | ○ |
| Working example 24 | Compound 8 | (structure) | ○ | ○ | ○ | ○ | ○ | ○ | ○ | ○ | ○ | ○ | ○ | ○ |
| Working example 25 | Compound 9 | (structure) | ○ | ○ | ○ | ○ | ○ | ○ | ○ | ○ | ○ | ○ | ○ | ○ |

TABLE 2B

| Working example | Compound | Structural formula | Heating temperature (° C.) | | | | | | | | | | | |
|---|---|---|---|---|---|---|---|---|---|---|---|---|---|---|
| | | | 150 | 160 | 170 | 180 | 190 | 200 | 210 | 220 | 230 | 240 | 250 | 260 |
| Working example 26 | Compound 10 | (structure) | ○ | ○ | ○ | ○ | ○ | ○ | ○ | ○ | ○ | ○ | ○ | ○ |
| Working example 27 | Compound 11 | (structure) | ○ | ○ | ○ | ○ | ○ | ○ | ○ | ○ | ○ | ○ | ○ | ○ |
| Working example 28 | Compound 12 | (structure) | ○ | ○ | ○ | ○ | ○ | ○ | ○ | ○ | ○ | ○ | ○ | ○ |
| Working example 29 | Compound 13 | (structure) | ○ | ○ | ○ | ○ | ○ | ○ | ○ | ○ | ○ | ○ | ○ | ○ |

TABLE 2B-continued

| Working example | Compound | Structural formula | Heating temperature (° C.) | | | | | | | | | | | |
|---|---|---|---|---|---|---|---|---|---|---|---|---|---|---|
| | | | 150 | 160 | 170 | 180 | 190 | 200 | 210 | 220 | 230 | 240 | 250 | 260 |
| Working example 30 | Compound 14 | (structure) | ○ | ○ | ○ | ○ | ○ | ○ | ○ | ○ | ○ | ○ | ○ | ○ |
| Working example 31 | Compound 15 | (structure) | ○ | ○ | ○ | ○ | ○ | ○ | ○ | ○ | ○ | ○ | ○ | ○ |
| Working example 32 | Compound 16 | (structure) | ○ | ○ | ○ | ○ | ○ | ○ | ○ | ○ | ○ | ○ | ○ | ○ |
| Comparative example 2 | Compound 17 | (structure) | ○ | ○ | ○ | × | × | × | × | × | × | × | × | × |

4. Sublimation Evaluation B of Ultraviolet Absorber

TG-DTA was used for the compounds 1 to 21 to evaluate anti-sublimation properties of the ultraviolet absorbers by elevating the temperature of the compounds in the air from room temperature at 5° C./min and keeping them at 210° C. for 30 minutes to measure weight losses (%) thereof.

Tables 3A and 3B show the results. The weight losses of the compounds 1 to 16 were 0.8% or less while the weight losses of the compounds 18 to 21 and compound 17 of the conventional ultraviolet absorber were 0.9% or more. Particularly, compounds 1, 2, 3, 6, 9, 12 and 14 exhibited weight losses of not larger than 0.6%, thus showing an excellent anti-sublimation property. These results indicate that the ultraviolet absorbers containing the thioether group in working examples exhibit small weight losses and have an excellent anti-sublimation property.

TABLE 3A

| Working example | Compound | Structural formula | Weight loss (%) |
|---|---|---|---|
| Working example 33 | Compound 1 | 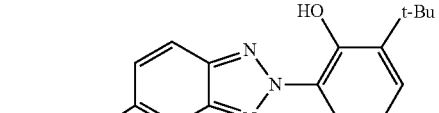 | 0.5 |
| Working example 34 | Compound 2 | 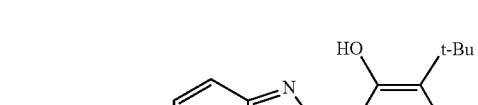 | 0.6 |

TABLE 3A-continued

| Working example | Compound | Structural formula | Weight loss (%) |
|---|---|---|---|
| Working example 35 | Compound 3 | (structure) | 0.5 |
| Working example 36 | Compound 4 | (structure) | 0.8 |
| Working example 37 | Compound 5 | (structure) | 0.8 |
| Working example 38 | Compound 6 | (structure) | 0.3 |
| Working example 39 | Compound 7 | (structure) | 0.7 |
| Working example 40 | Compound 8 | (structure) | 0.7 |
| Working example 41 | Compound 9 | (structure) | 0.5 |

TABLE 3B

| Working example | Compound | Structural formula | Weight loss (%) |
|---|---|---|---|
| Working example 42 | Compound 10 | cyclohexyl-S-benzotriazole-N-(2-hydroxy-3-t-Bu-5-Me-phenyl) | 0.8 |
| Working example 43 | Compound 11 | phenyl-CH₂-S-benzotriazole-N-(2-hydroxy-3-t-Bu-5-Me-phenyl) | 0.8 |
| Working example 44 | Compound 12 | CH₃-C(=O)-O(CH₂)₆-S-benzotriazole-N-(2-hydroxy-3-tBu-5-Me-phenyl) | 0.6 |
| Working example 45 | Compound 13 | CH₃-C(=O)-O(CH₂)₆-S-benzotriazole-N-(2-hydroxy-3-tBu-5-Me-phenyl) | 0.7 |
| Working example 46 | Compound 14 | phenyl-C(=O)-NH-(p-phenylene)-S-benzotriazole-N-(2-hydroxy-3-tBu-5-Me-phenyl) | 0.3 |
| Working example 47 | Compound 15 | CH₃CH₂-NH-C(=O)-NH-(p-phenylene)-S-benzotriazole-N-(2-hydroxy-3-tBu-5-Me-phenyl) | 0.8 |
| Working example 48 | Compound 16 | phenyl-NH-C(=O)-NH-(p-phenylene)-S-benzotriazole-N-(2-hydroxy-3-tBu-5-Me-phenyl) | 0.8 |
| Comparative example 3 | Compound 17 | Cl-benzotriazole-N-(2-hydroxy-3-t-Bu-5-Me-phenyl) | 14.3 |

TABLE 3B-continued

| Working example | Compound | Structural formula | Weight loss (%) |
| --- | --- | --- | --- |
| Comparative example 4 | Compound 18 | Working example 1 in JP-A-H9-95658 | 1.8 |
| Comparative example 5 | Compound 19 | Working example 2 in JP-A-H9-95658 | 0.9 |
| Comparative example 6 | Compound 20 | Working example 3 in JP-A-H9-95658 | 2.2 |
| Comparative example 7 | Compound 21 | Working example 4 in JP-A-H9-95658 | 1.9 |

5. Sublimation Evaluation of Ultraviolet Absorber in Resin Molding Material

Polystyrene resin (PS), polymethyl methacrylate resin (Acryl), polycarbonate resin (PC), acrylonitrile-butadiene-styrene copolymer resin (ABS), polyethylene terephthalate (PET) and cycloolefin polymer resin (COP) were each heated to the corresponding melting temperature (PS: 100° C., Acryl: 160° C., PC: 220° C., ABS: 220° C., PET: 260° C., COP: 100° C.) or higher to melt the respective resin, and then the ultraviolet absorber was mixed thereinto to obtain a resin molding material 1 containing 5% of the ultraviolet absorber. TG-DTA was used for the obtained resin molding materials to measure residual ratios of the ultraviolet absorbers in the resin molding materials during heating to evaluate their sublimation properties. First, it was observed that the weight loss of the resin, if containing no ultraviolet absorber, was not larger than 0.1% with a heat-up ratio of 10° C./min, holding time of 1 h, and holding temperature as shown in Table 4 (260° C. or less). Next, weight loss dependencies of the ultraviolet absorbers at respective temperatures were measured for the above resin molding materials 1 to calculate residual ratios of the ultraviolet absorbers (See table 4).

As illustrated in Table 4, compounds 1 to 8 showed, as compared to the compound 17 which is an ultraviolet absorber of a comparative example, higher residual ratios and smaller sublimation tendencies of the ultraviolet absorber in the resin molding materials, indicating a superior effect of suppressing contamination within the apparatus caused by sublimation during thermal molding or processing of the resin, and also a superior retainability of optical properties of the molding materials. The resin molding materials 1 containing the compounds 1 to 8 retained their transparency before and after the heating.

Further, polyacetal resin (PA), polyamide resin (polyamide) and polyphenylenesulfide (PPS) were each heated to the corresponding melting temperature (PA: 180° C., polyamide: 260° C., PPS: 260° C.) or higher to melt the respective resin, and then the tests were conducted under similar conditions as shown above. The results showed that for all of the resins, compounds 1 and 2 exhibited residual ratios of 2 to 10% or more higher than that of the compound 17 which is an ultraviolet absorber of a comparative example.

Further, for each of the resins, the resin molding materials 1 containing 5% of the ultraviolet absorber were each heated to the above melting temperature or higher, and then a further resin was mixed thereinto to obtain a resin molding material 2 such that the ultraviolet absorber concentration therein became 1%. Residual ratios of the ultraviolet absorbers in the resin molding materials 2 were measured to evaluate sublimation properties in a manner similar to that as already shown above (see Table 4).

For each of the resin molding materials 2 containing the compounds 1 to 8 of working examples, the material showed a higher residual ratio, as compared to the resin molding materials 2 of the comparative examples, which indicates that the resin molding material is less prone to ultraviolet absorber sublimation during first and second processings of the resin, and also during thermal processing (molding) to be performed thereafter. The materials were shown to suppress contamination in facilities, and were excellent in retaining optical properties. Further, the resin molding materials 2 thus obtained retained their transparency before and after the heating. Further an overall rank of the residual ratios among the respective resin molding materials 1 and 2 shown above (working examples 49 to 56) was in the order of (PS, Acryl, COP)>PC>ABS>PET.

Further, it was found that the inventive resin molding materials is less prone to sublimation in styrene-based resin (polystyrene:residual ratio of not smaller than 99%), (meth)acrylic-based resin (acrylic resin:residual ratio of not smaller than 99%), cycloolefin-based resin (cycloolefin polymer: residual ratio of not smaller than 99%), polycarbonate-based resin(polycarbonate:residual ratio of not smaller than 85%), and the material is even less prone to sublimation in styrene-based resin(polystyrene:residual ratio of not smaller than 99%), (meth)acrylic-based resin(acrylic resin:residual ratio of not smaller than 99%), cycloolefin-based resin(cycloolefin polymer:residual ratio of not smaller than 99%).

Further, polyacetal resin (PA), polyamide resin (polyamide) and polyphenylenesulfide (PPS) were each heated to the corresponding melting temperature (PA: 180° C., polyamide: 260° C., PPS: 260° C.) or higher to melt the respective resin, and then the tests were conducted under similar conditions as shown above. The results showed that for all of the resins, compounds 1 and 2 exhibited residual ratios that are higher than that of the compound 17 which is an ultraviolet absorber of comparative example.

TABLE 4

| Working example | Compound | | Residual ratio (%) of ultraviolet absorbers in resin molding material 1. | | | | | Residual ratio (%) of ultraviolet absorbers in resin molding material 2. | | | | | |
|---|---|---|---|---|---|---|---|---|---|---|---|---|---|
| | | | 100° C. PS | 160° C. Acryl | 220° C. PC | 220° C. ABS | 260° C. PET | 100° C. COP | 100° C. PS | 160° C. Acryl | 220° C. PC | 220° C. ABS | 260° C. PET | 100° C. COP |
| Working example 49 | Compound 1 | (structure: benzotriazole with HO, t-Bu, Me phenol and CH₃(CH₂)₇S substituent) | >99% | >99% | 96% | 88% | 84% | >99% | >99% | >99% | 98% | 93% | 85% | >99% |
| Working example 50 | Compound 2 | (structure: benzotriazole with HO, t-Bu, Me phenol and S-phenyl substituent) | >99% | >99% | 90% | 74% | 68% | >99% | >99% | >99% | 91% | 90% | 80% | >99% |
| Working example 51 | Compound 3 | (structure: benzotriazole with HO, t-Bu, Me phenol and S-(4-Me-phenyl) substituent) | >99% | >99% | 86% | 70% | 70% | — | >99% | >99% | 90% | 90% | 80% | — |
| Working example 52 | Compound 4 | (structure: benzotriazole with HO, t-Bu, Me phenol and S-(4-i-Pr-phenyl) substituent) | >99% | >99% | 88% | 84% | 74% | — | >99% | >99% | >99% | >99% | >99% | — |
| Working example 53 | Compound 5 | (structure: benzotriazole with HO, t-Bu, Me phenol and S-(4-t-Bu-phenyl) substituent) | >99% | >99% | 92% | 84% | 70% | >99% | >99% | >99% | >99% | >99% | >99% | >99% |

TABLE 4-continued

| | | Compound | Residual ratio (%) of ultraviolet absorbers in resin molding material 1. | | | | | Residual ratio (%) of ultraviolet absorbers in resin molding material 2. | | | | | |
|---|---|---|---|---|---|---|---|---|---|---|---|---|---|
| | | | 100° C. PS | 160° C. Acryl | 220° C. PC | 220° C. ABS | 260° C. PET | 100° C. COP | 100° C. PS | 160° C. Acryl | 220° C. PC | 220° C. ABS | 260° C. PET | 100° C. COP |
| Working example 54 | Compound 6 | (structure) | >99% | >99% | 95% | 88% | 90% | — | >99% | >99% | >99% | >99% | 95% | — |
| Working example 55 | Compound 7 | (structure) | >99% | >99% | 98% | 88% | 94% | — | >99% | >99% | >99% | >99% | 95% | — |
| Working example 56 | Compound 8 | (structure) | >99% | >99% | 98% | 90% | 95% | — | >99% | >99% | >99% | >99% | 95% | — |
| Comparative example 8 | Compound 17 | (structure) | 96% | 97% | 70% | 64% | 62% | 96% | 96% | 95% | 72% | 68% | 65% | 96% |

A resin processing test machine was actually used to mix each of the compounds 1 and 17 with a resin to make a resin molding material. The machine was less contaminated by sublimation of the compound 1 compared to the case of compound 17. Further, yellowing was suppressed, and the resin molding material superior in absorbing long wave length light was obtained. It was thus found that the resin molding material employing a 2-phenylbenzotriazole derivative that contains a thioether-containing group is effective in anti-sublimation and optical properties.

Figure 5:
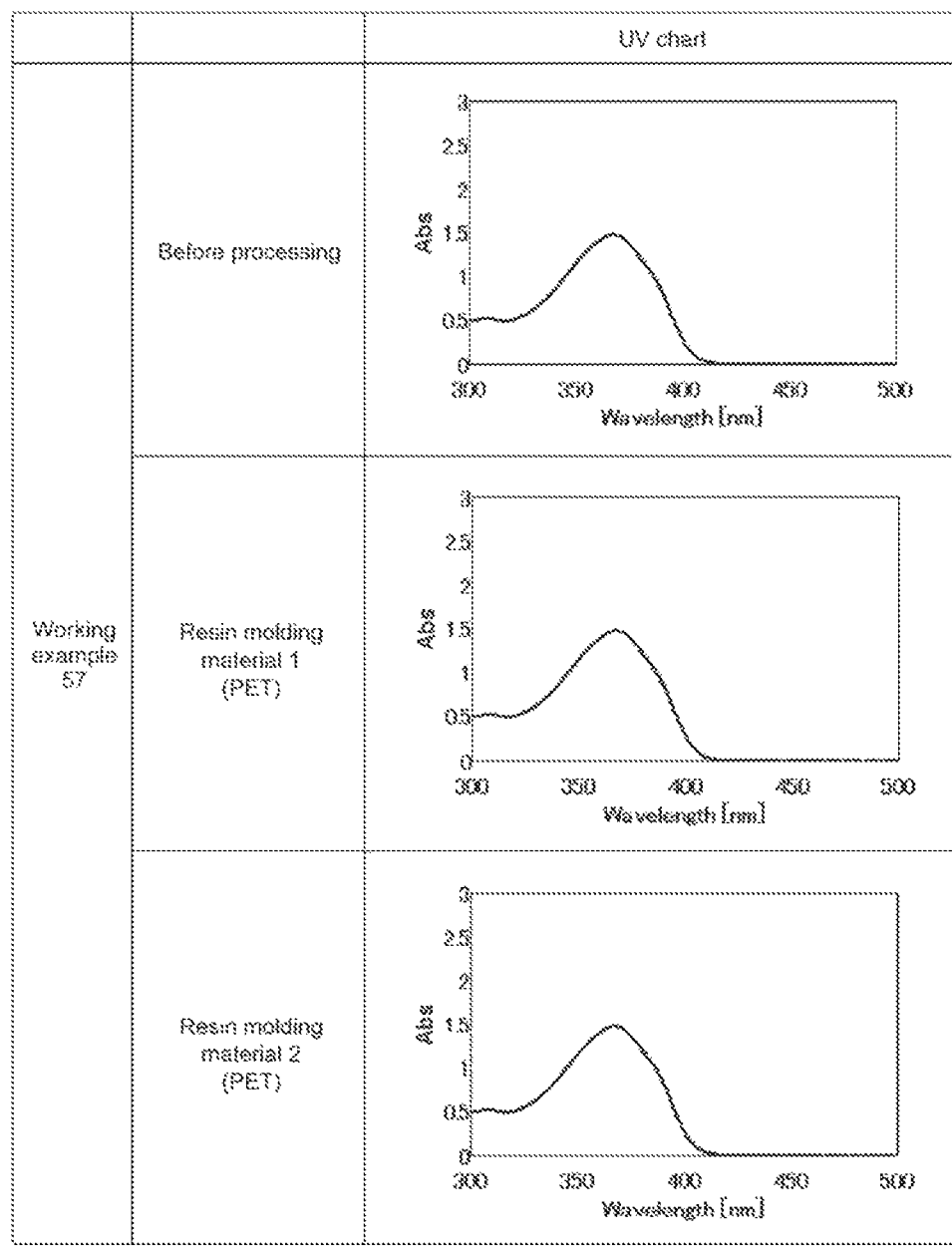
FIG. 5 is a set of ultraviolet-visible absorption spectra (UV charts) of the one before processing, resin molding material 1 and resin molding material 2 in working example 57.

Further, compound 1 and PET resin molding materials 1 and 2 containing the compound 1 obtained as shown above were each dissolved in chloroform to measure the absorption spectrum (See FIG. 5, working example 57). There was observed no change in the peaks that originate from the compound 1 of the resin molding materials 1 and 2 from the peak of compound 1; i.e., it was found that the inventive product retains optical property in heat processing that is performed during and/or after the first processing.

The invention claimed is:

1. A resin molding material for use in heat processing comprising: a 2-phenylbenzotriazole derivative that contains a thioether-containing group; and a resin, wherein the 2-phenylbenzotriazole derivative is represented by the following formula (I):

[Chemical formula 1]

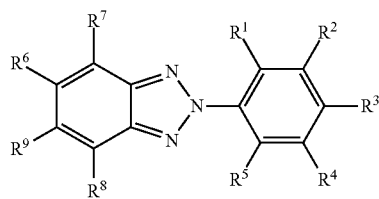

(I)

wherein each of the $R^1$ to $R^9$ independently represents a monovalent or divalent group selected from a hydrogen atom, a hydrocarbon group, an aromatic group, an unsaturated group, a nitrogen-containing group, a sulfur-containing group, an oxygen-containing group, a phosphorus-containing group, an alicyclic group, a halogen atom and a thioether-containing group represented by the following formula (i) with the proviso that at least one of the $R^1$ to $R^9$ is a thioether-containing group represented by the following formula (i), and that any two of $R^1$ to $R^9$ together form a ring if they are divalent groups

[Chemical formula 2]

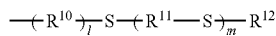

(i)

wherein in formula (i), $R^{10}$ represents a divalent hydrocarbon group having 1 to 20 carbon atoms in which hydrogen atoms may be substituted with, at least one of two ends may be interrupted by, or carbon-carbon bonds may be interrupted by a monovalent or divalent group selected from an aromatic group, an unsaturated group, a nitrogen-containing group, a sulfur-containing group, an oxygen-containing group, a phosphorus-containing group, an alicyclic group and a halogen atom;

$R^{11}$ represents a divalent hydrocarbon group having 1 to 20 carbon atoms in which hydrogen atoms may be substituted with, at least one of two ends may be interrupted by, or carbon-carbon bonds may be interrupted by a monovalent or divalent group selected from an aromatic group, an unsaturated group, a nitrogen-containing group, a sulfur-containing group, an oxygen-containing group, a phosphorus-containing group, an alicyclic group and a halogen atom with the proviso that each of $R^{11}$ is independently provided if m is not smaller than 2;

$R^{12}$ is represented by the following formula (j):

[Chemical formula 3]

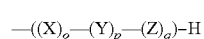

(j)

wherein X is a divalent aliphatic hydrocarbon group of which a hydrogen atom(s) may be substituted, Y is a divalent aromatic or alicyclic hydrocarbon group of which a hydrogen atom(s) may be substituted, Z is either a divalent heteroatom-containing group $Z^1$ selected from a nitrogen-containing group, an oxygen-containing group, a sulfur-containing group and a phosphorus-containing group, or a divalent heteroatom $Z^2$ selected from an oxygen atom and a sulfur atom;

wherein o, p and q are integers not smaller than 0; and wherein X, Y and Z, respectively provided in the number of o, p and q, are independently provided, and the X, Y and Z may be in any sequential order; and wherein at least one of the o and p is an integer of 1 or more; and wherein l represents an integer of 0 or 1, and m represents an integer of 0 to 3.

2. The resin molding material according to claim 1, wherein $R^{12}$ contains a divalent aliphatic hydrocarbon group X of which o is 1 to 4.

3. The resin molding material according to claim 1, wherein $R^{12}$ contains a divalent aromatic or alicyclic hydrocarbon group Y of which p is 1 to 4.

4. The resin molding material according to claim 1, wherein $R^{12}$ contains a divalent heteroatom-containing group $Z^1$ of which q is 1 to 4, said divalent heteroatom-containing group $Z^1$ being selected from a nitrogen-containing group, an oxygen-containing group, a sulfur-containing group and a phosphorus-containing group.

5. The resin molding material according to claim 1, wherein $R^{12}$ contains a divalent aliphatic hydrocarbon group X of which o is 1 to 4, and a divalent aromatic or alicyclic hydrocarbon group Y of which p is 1 to 4.

6. The resin molding material according to claim 1, wherein $R^{12}$ contains a divalent aliphatic hydrocarbon group X of which o is 1 to 4, and a divalent heteroatom-containing group $Z^1$ of which q is 1 to 4, said divalent heteroatom-containing group $Z^1$ being selected from a nitrogen-containing group, an oxygen-containing group, a sulfur-containing group and a phosphorus-containing group.

7. The resin molding material according to claim 1, wherein $R^{12}$ contains a divalent aromatic or alicyclic hydrocarbon group Y of which p is 1 to 4, and a divalent heteroatom-containing group $Z^1$ of which q is 1 to 4, said divalent heteroatom-containing group $Z^1$ being selected from a nitrogen-containing group, an oxygen-containing group, a sulfur-containing group and a phosphorus-containing group.

8. The resin molding material according to claim 1, wherein $R^{12}$ contains a divalent aliphatic hydrocarbon group X of which o is 1 to 4, a divalent aromatic or alicyclic hydrocarbon group Y of which p is 1 to 4, and a divalent heteroatom-containing group $Z^1$ of which q is 1 to 4, said divalent heteroatom-containing group $Z^1$ being selected from a nitrogen-containing group, an oxygen-containing group, a sulfur-containing group and a phosphorus-containing group.

9. The resin molding material according to claim 1, wherein the resin is a thermoplastic resin.

10. The resin molding material according to claim 9, wherein the thermoplastic resin is a resin selected from a styrene-based resin, an ether-based resin, a (meth)acrylic-based resin, a cycloolefin-based resin, a polycarbonate-based resin, a polyphenylenesulfide-based resin, a polyamide-based resin, an acrylonitrile-butadiene-styrene-based copolymer and an ester-based resin.

11. The resin molding material according to claim 1, wherein the resin molding material is of a pellet, masterbatch or compound.

12. A method for producing the resin molding material according to claim 11, the method comprising hot-melt compounding of a resin and a 2-phenylbenzotriazole derivative that contains a thioether-containing group.

13. A method for producing a resin member, a resin molded product or a resin molded article, the method comprising hot-melt compounding of the resin molding material according to claim 11 to produce the resin member, the resin molded product or the resin molded article.

* * * * *